(12) United States Patent  
Tanaami et al.

(10) Patent No.: US 8,168,559 B2  
(45) Date of Patent: May 1, 2012

(54) PRODUCTION METHOD OF OXIDATION CATALYST DEVICE FOR EXHAUST GAS PURIFICATION

(75) Inventors: Kiyoshi Tanaami, Wako (JP); Yuji Isogai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 189 days.

(21) Appl. No.: 12/420,173

(22) Filed: Apr. 8, 2009

(65) Prior Publication Data

US 2009/0270250 A1 Oct. 29, 2009

(30) Foreign Application Priority Data

Apr. 25, 2008 (JP) ................. 2008-114992  
Apr. 28, 2008 (JP) ................. 2008-117148  
Apr. 28, 2008 (JP) ................. 2008-117149

(51) Int. Cl.  
*B01J 23/00* (2006.01)

(52) U.S. Cl. ........ 502/302; 423/213; 423/239; 502/300; 502/335; 502/185

(58) Field of Classification Search .............. 502/302  
See application file for complete search history.

(56) References Cited

U.S. PATENT DOCUMENTS

| 7,014,825 B2 * | 3/2006 | Golden ................. 423/213.2 |
| 7,462,577 B2 * | 12/2008 | Fetcenko et al. ......... 502/300 |
| 2004/0191133 A1 * | 9/2004 | Yamaguchi ............... 422/180 |
| 2005/0266986 A1 * | 12/2005 | Tanaka et al. ............ 502/326 |
| 2008/0004174 A1 * | 1/2008 | Itoh et al. ............... 502/100 |
| 2009/0193796 A1 * | 8/2009 | Wei et al. ................ 60/297 |

FOREIGN PATENT DOCUMENTS

| EP | 1 723 998 A1 | 11/2006 |
| EP | 1914000 A1 | 4/2008 |
| EP | 2067518 A2 | 6/2009 |
| JP | 2002-66338 A | 3/2002 |
| JP | EP1723998 | * 11/2005 |
| JP | EP1723998 | * 11/2006 |
| JP | 2007-237012 A | 9/2007 |
| JP | EP1842591 | * 10/2007 |
| JP | EP1914000 | * 4/2008 |
| WO | WO-02/083301 A2 | 10/2002 |

* cited by examiner

*Primary Examiner* — Melvin Mayes  
*Assistant Examiner* — Colette Nguyen  
(74) *Attorney, Agent, or Firm* — Birch, Stewart, Kolasch & Birch, LLP

(57) ABSTRACT

According to a first embodiment of a production method of an oxidation catalyst device for exhaust gas purification of the present invention, a plurality of slurries containing a catalyst precursor prepared from mutually different organic acids is coated respectively on a porous filter carrier (2) and calcined. According to a second embodiment of the present invention, the slurry contains the catalyst precursor having a particle diameter distribution ranging from 0.5 to 10 μm, and the slurry has a viscosity equal to or below 2.0 mPa·s. The oxidation catalyst device of the present invention is composed of a composite metal oxide on a surface of a cell division and a surface of an air pore of the porous filter carrier having a wall-flow structure.

9 Claims, 35 Drawing Sheets

PRODUCTION METHOD OF OXIDATION CATALYST DEVICE FOR EXHAUST GAS PURIFICATION

BACKGROUND OF THE INVENTION

1. Field of the Invention

The present invention relates to a production method of an oxidation catalyst device for exhaust gas purification which purifies an exhaust gas from an internal combustion engine by oxidizing particulates contained therein with a catalyst composed of a composite metal oxide.

2. Description of the Related Art

Conventionally, there has been known an oxidation catalyst device for exhaust gas purification disclosed in, for example, Japanese Patent Laid-open No. 2002-66338, to purify an exhaust gas from an internal combustion engine by oxidizing particulates or hydrocarbons contained therein. The oxidation catalyst device includes a porous filter carrier having a plurality of cells formed from a plurality of perforated galleries which penetrate through the porous filter carrier in the axial direction and a boundary of each cell as a cell division, and an oxidation catalyst coated on the cell division.

It is known that a perovskite composite metal oxide having a general formula of $AMO_3$ is used as the oxidation catalyst. In the general formula, the component A is at least one metal selected from a group of La, Y, Dy and Nd; and the component M is at least one metal selected from a group of Mn, Fe and Co. The perovskite composite metal oxide is prepared by substituting a part of the component A with at least one metal selected from a group of, for example, Sr, Ba and Mg. As a specific example of the perovskite composite metal oxide, $La_{1-x}Sr_xFeO_3$, $La_{1-x}Ba_xFeO_3$ and so forth may be given.

The oxidation catalyst device for exhaust gas purification may be produced in the following method: an organic complex prepared from a metal salt of each metal of the components A and M and an organic acid is formed as a catalyst precursor, a slurry containing the catalyst precursor is coated on a cell division of the porous filter carrier, and calcining the porous filter carrier to produce the oxidation catalyst device. Herein, the organic complex, as disclosed in, for example, Japanese Patent Laid-open No. 2007-237012, can be prepared by mixing an organic acid which may form the organic complex, such as sodium citrate, sodium maliate, sodium ethylene diamine tetra-acetate or the like, with a metal salt of each metal of the components A and M in a desired stoichiometric ratio and adding water.

However, in the oxidation catalyst device for exhaust gas purification mentioned above, there is a problem that it is difficult to raise a combustion performance of the particulates at a temperature below 300° C.

The porous filter carrier may be, for example, a rectangular one with a plurality of perforated galleries penetrated through the porous filter carrier in the axial direction disposed in a latticed pattern when viewed in profile. Accordingly, the coating of the slurry can be performed by streaming the slurry in the perforated gallery of the porous filter carrier from an opening portion thereof.

According to the oxidation catalyst device for exhaust gas purification produced in the above-mentioned method, it is conceivable that the combustion temperature at which the particulates in the exhaust gas from the internal combustion engine are combusted can be lowered. However, it is desirable to further lower the combustion temperature of the particulates.

Accordingly, there is disclosed in, for example, Japanese Patent Laid-open No. 2007-237012, an art to lower the combustion temperature of the particulates by forming not only a catalyst layer on the surface of the porous filter carrier but also on a wall surface of an air pore formed in the porous filter carrier. In the mentioned patent document, there is described a method for entering the slurry inside an air pore by sucking the slurry inside the perforated gallery from the opening portion thereof so as to form the catalyst layer on the wall surface of the air pore formed in the porous filter carrier. According to this method, a catalyst layer can be formed not only on the surface of the porous filter carrier but also on the wall surface of the air pore formed in the porous filter carrier. According thereto, the combustion temperature of the particulates can be lowered.

According to the method, the slurry is coated inside the air pore by sucking, therefore, a special device or equipment for sucking the slurry will be needed, leading to a problem of increased manufacture cost.

SUMMARY OF THE INVENTION

The present invention has been accomplished to solve the aforementioned problems, and it is therefore an object of the present invention to provide a production method of an oxidation catalyst device for exhaust gas purification capable of increasing a combustion performance of particulates contained in an exhaust gas from an internal combustion engine at a temperature below 300° C.

It is another object of the present invention to provide a cheap production method of an oxidation catalyst device for exhaust gas purification capable of purifying an exhaust gas from an internal combustion engine by oxidizing particulates contained therein at a lower temperature.

It is further an object of the present invention to provide an oxidation catalyst device for exhaust gas purification capable of purifying an exhaust gas from an internal combustion engine by oxidizing particulates contained therein at a lower temperature.

To attain an object described above according to the present invention, there is provided a production method of an oxidation catalyst device for exhaust gas purification which purifies an exhaust gas from an internal combustion engine by oxidizing particulates contained therein with a catalyst composed of a composite metal oxide, including steps of calcining a mixture of a plurality of metal compounds served as components of the composite metal oxide, an organic acid and water to prepare a catalyst precursor; grinding a mixture of the prepared catalyst precursor, water and a binder to prepare a slurry; coating the slurry to a porous filter carrier; and calcining the porous filter carrier coated with the slurry to convert the catalyst precursor into the composite metal oxide to form a porous catalyst layer supported on the porous filter carrier.

The slurry in a first aspect of the production method of the present invention includes plural kinds of slurries which contain the catalyst precursors prepared respectively from mutually different organic acids, and the porous catalyst layer is formed by repeating for each kind of slurry selected from the plural kinds of slurries an operation which includes coating the selected kind of slurry on the porous filter carrier and calcining the porous filter carrier coated with the selected kind of slurry.

According to the first aspect of the production method of the present invention, a plurality of metal compounds served as ingredients of the composite metal oxide, an organic acid and water are mixed to yield the catalyst precursor after calcination. Herein, if mutually different kinds of organic acids are used, then plural kinds of catalyst precursors can be obtained. Thereafter, by grinding a mixture of each of the plural kinds of catalyst precursors, water and a binder, plural kinds of slurries corresponding to the plural kinds of catalyst precursors, respectively, are prepared.

According to the first aspect of the present invention, the porous catalyst layer is formed by repeating for each kind of slurry selected from the plural kinds of slurries an operation which includes coating the selected kind of slurry on the porous filter carrier and calcining the porous filter carrier coated with the selected kind of slurry. According thereto, the porous catalyst layer can be formed to have mutually different porosity corresponding to each of the mutually different kinds of organic acids.

As a result thereof, according to the oxidation catalyst device for exhaust gas purification obtained from the first aspect of the present invention, the combustion performance of particulates can be raised at a temperature below 300° C.

According to the first aspect of the production method of the present invention, it is preferable that a porosity of the porous catalyst layer increases along a thickness direction from a surface of the porous catalyst layer which is close to the porous filter carrier toward the other surface thereof in order to raise the combustion performance of particulates at a temperature below 300° C.

According to the first aspect of the production method of the present invention, it is preferable that the plural kinds of slurries contain the catalyst precursors prepared from, for example, citric acid, malic acid and glutamic acid, respectively. First, a first slurry containing a first catalyst precursor prepared from citric acid is coated on the porous filter carrier, thereafter, the porous filter carrier coated with the first slurry is calcined to form a first porous catalyst layer. Then, a second slurry containing a second catalyst precursor prepared from malic acid is coated on the first porous catalyst layer, thereafter, the porous filter carrier coated with the second slurry is calcined to form a second porous catalyst layer. Subsequently, a third slurry containing a third catalyst precursor prepared from glutamic acid is coated on the second porous catalyst layer, thereafter, the porous filter carrier coated with the third slurry is calcined to form a third porous catalyst layer.

According thereto, the porous catalyst layer can be formed to have the porosity greater at a portion close to the surface side of the porous catalyst layer and smaller at a portion close to the porous filter carrier side.

According to the first aspect of the production method of the present invention, an yttrium compound, a manganese compound, a silver compound and a ruthenium compound can be used as the plurality of metal compounds. A zirconia sol can be used as the binder.

According to the first aspect of the production method of the present invention, it is preferable that the porous catalyst layer is composed of the composite metal oxide having a general formula of $Y_{1-x}Ag_xMn_{1-y}Ru_yO_3$, wherein $0.01 \leq x \leq 0.15$ and $0.005 \leq y \leq 0.2$.

According to a second aspect of the production method of the present invention, the slurry contains the catalyst precursor having a particle diameter distribution ranging from 0.5 to 10 µm, and the slurry has a viscosity equal to or below 2.0 mPa·s. It is preferable that the viscosity of the slurry ranges from 1.3 to 2.0 mPa·s.

According to the second aspect of the present invention, the slurry can be coated on the porous filter carrier by flowing into an air pore only without the necessity to suck the slurry into the air pore. It is also possible to prevent the slurry from occluding an opening portion of the air pore in the porous filter carrier.

According to the second aspect of the present invention, the porous filter carrier coated with the slurry is calcined thereafter. Therefore, it is cheap and easy to produce the oxidation catalyst device for exhaust gas purification having a porous catalyst layer formed not only on a surface of the porous filter carrier but also a porous catalyst layer on a wall surface of an air pore formed in the porous filter carrier.

According to the second aspect of the present invention, if the particle diameter of the catalyst precursor is distributed below than 0.5 µm, the slurry cannot be retained in the air pore of the porous filter carrier, thereby, it is impossible to evenly coat the porous catalyst layer on the wall surface of the air pore. On the other hand, if the particle diameter of the catalyst precursor is distributed greater than 10 µm, the slurry cannot enter into the air pore of the porous filter carrier, thereby, it is impossible to coat the porous catalyst layer on the wall surface of the air pore.

In addition, if the viscosity of the slurry is greater than 2.0 mPa·s, the slurry cannot enter into the air pore of the porous filter carrier, thereby, it is impossible to coat the porous catalyst layer on the wall surface of the air pore. On the other hand, if the viscosity of the slurry is below 1.3 mPa·s, the slurry cannot be retained in the air pore of the porous filter carrier, thereby, it is impossible to evenly coat the porous catalyst layer on the wall surface of the air pore.

By adjusting the amount of water added therein, for example, the slurry can be prepared to have a viscosity in the above-mentioned range.

According to the second aspect of the production method of the present invention, it is preferable that the porous catalyst layer has a micropore with a diameter ranging from 0.01 to 3.5 µm, and a total porosity of the porous filter carrier and the porous catalyst layer ranges from 45 to 50 V %. According thereto, the oxidation catalyst device for exhaust gas purification produced therefrom can be provided with the porous catalyst layer having a sufficient volume for combusting the particulates to have a sufficient contact with the particulates through the micropore. Thereby, the combustion temperature of the particulates can be reduced absolutely.

According to the second aspect of the production method of the present invention, if the diameter of the micropore in the porous catalyst layer is below 0.01 µm, the pressure of the exhaust gas lost when passing the micropore may become greater. On the other hand, however, if the diameter of the micropore in the porous catalyst layer is greater than 3.5 µm, the particulates in the exhaust gas cannot have a sufficient contact with the surface of the micropore; thereby, the combustion temperature of the particulates may not be reduced.

If the total porosity of the porous filter carrier and the porous catalyst layer is below 45%, the pressure loss may become greater. On the other hand, however, if the total porosity of the porous filter carrier and the porous catalyst layer is greater than 50%, the contact probability between the exhaust gas and the porous catalyst layer is lowered, thereby, the combustion temperature of the particulates may not be reduced.

According to the second aspect of the production method of the present invention, the porous catalyst layer can be made from, for example, the composite metal oxide having a general formula of $Y_{1-x}Ag_xMn_{1-y}Ru_yO_3$, wherein $0.01 \leq x \leq 0.15$ and $0.005 \leq y \leq 0.2$.

An oxidation catalyst device for exhaust gas purification which purifies an exhaust gas from an internal combustion engine by oxidizing particulates contained therein with a catalyst composed of a composite metal oxide of the present invention comprises: a porous filter carrier which includes a plurality of inflow cells formed from a part of a plurality of perforated galleries which penetrate through the porous filter carrier in the axial direction by blocking an exhaust gas outflow portion while leaving an exhaust gas inflow portion open for each of the part of the plurality of perforated galleries, and a plurality of outflow cells formed from a part of the plurality of perforated galleries by blocking an exhaust gas inflow portion while leaving an exhaust gas outflow portion open for each of the part of the plurality of perforated galleries; and has a wall-flow structure by disposing the plurality of inflow cells and the plurality of outflow cells alternatively with a boundary of each cell as a cell division; a first porous catalyst layer which is composed of the composite metal oxide supported at least on a surface of the cell division close to each of the plurality of inflow cells; and a second porous catalyst layer which is composed of the composite metal oxide supported on a wall surface of an air pore formed in the porous filter carrier.

According to the oxidation catalyst device for exhaust gas purification of the present invention, the exhaust gas is guided into the inflow cell from the inflow portion of the inflow cell. Because the exhaust gas outflow portion of the inflow cell is blocked, the exhaust gas guided into the inflow cell flows into the outflow cell by passing the air pore of the porous filter carrier which forms the cell division, and is discharged out from the outflow portion of the outflow cell.

According to the oxidation catalyst device for exhaust gas purification of the present invention, the exhaust gas contacts not only the first porous catalyst layer supported on the surface of the cell division but also the second porous catalyst layer supported on the wall surface of the air pore, and consequently, the particulates contained in the exhaust gas are eliminated according to the catalyst reaction by each of the porous catalyst layers. Thereby, according to the oxidation catalyst device for exhaust gas purification, the particulates contained in the exhaust gas has a higher contact probability with the porous catalyst layers in comparison with the conventional arts, therefore, the particulates can be purified via oxidation at a lower temperature.

According to the oxidation catalyst device for exhaust gas purification of the present invention, it is desirable that each of the porous catalyst layers is a porous layer having a micropore with a diameter ranging from 0.01 to 3.5 μm, and a total porosity of the porous filter carrier and the porous catalyst layer ranges from 45 to 50 V %. By coating the second porous catalyst layer on the inner side of the air pores in the porous filter carrier of the oxidation catalyst device for exhaust gas purification of the present invention, the porosity can be assured in the mentioned range.

According to the above-mentioned configuration of the oxidation catalyst for exhaust gas purification of the present invention, the particulates can be made to have a sufficient contact with the porous catalyst layer, and as a result thereof, the combustion temperature for combusting the particulates can be reduced absolutely.

According to the oxidation catalyst for exhaust gas purification of the present invention, if the diameter of the micropore in the porous catalyst layer is below 0.01 μm, the pressure of the exhaust gas lost when passing the micropore may become greater. On the other hand, however, if the diameter of the micropore in the porous catalyst layer is greater than 3.5 μm, the particulates in the exhaust gas cannot have a sufficient contact with the surface of the micropore; thereby, the combustion temperature of the particulates may not be reduced.

If the total porosity of the porous filter carrier and the porous catalyst layer is below 45%, the pressure loss may become greater. On the other hand, however, if the total porosity of the porous filter carrier and the porous catalyst layer is greater than 50%, the contact certainty between the exhaust gas and the porous catalyst layer is lowered, thereby, the combustion temperature of the particulates may not be reduced.

According to the oxidation catalyst device for exhaust gas purification of the present invention, the porous catalyst layer can be made from, for example, the composite metal oxide having a general formula of $Y_{1-x}Ag_xMn_{1-y}Ru_yO_3$, wherein $0.01 \leq x \leq 0.15$ and $0.005 \leq y \leq 0.2$.

DETAILED DESCRIPTION OF THE PREFERRED EMBODIMENTS

Hereinafter, an embodiment of the present invention will be further described in detail with reference to the drawings.

Figure 1:
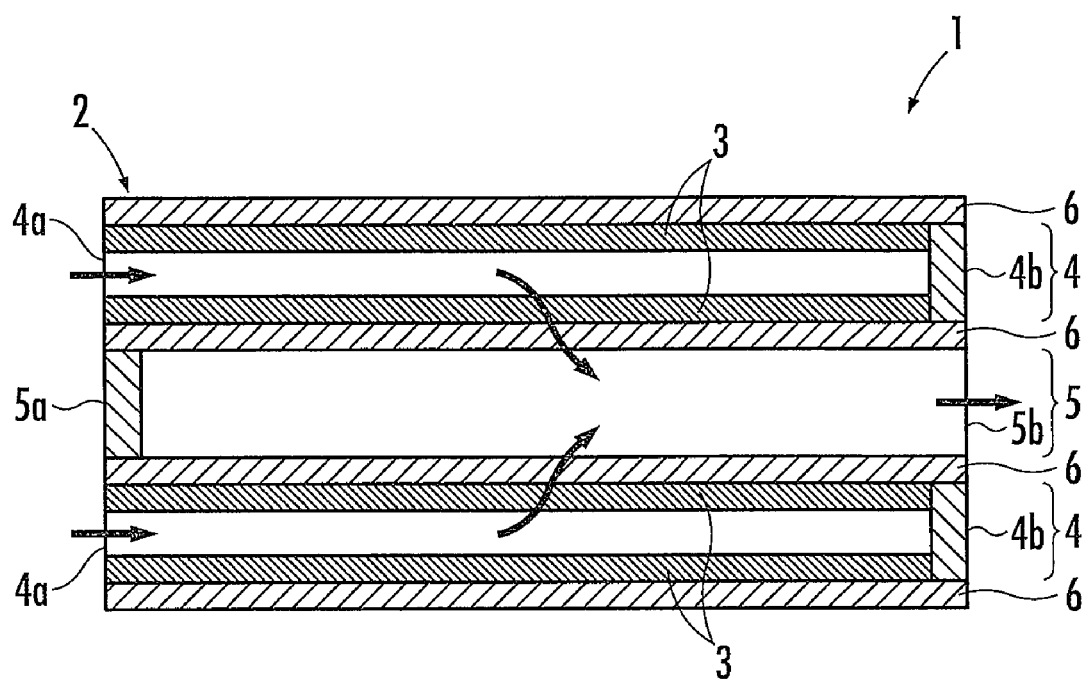
FIG. 1 is an explanatory sectional diagram illustrating a configuration of an oxidation catalyst device for exhaust gas purification produced by a first embodiment of a production method thereof according to the present invention.

As illustrated in FIG. 1, an oxidation catalyst device for exhaust gas purification 1 produced according to a first aspect of a production method in the present embodiment includes a porous filter carrier 2 having a wall-flow structure, and a porous catalyst layer 3 supported on the porous filter carrier 2. When exhaust gas from an internal combustion engine is flown through the oxidation catalyst device for exhaust gas purification 1, the oxidation catalyst device for exhaust gas purification 1 purifies the exhaust gas by oxidizing particulates contained therein.

The porous filter carrier 2 is substantially a rectangular porous SiC solid with a plurality of perforated galleries penetrating through the porous filter carrier 2 in the axial direction and being disposed in a lattice pattern when viewed in profile. The porous filter carrier 2 is provided with a plurality of inflow cells 4 and outflow cells 5 formed from the perforated galleries. The porous filter carrier 2 includes a plurality of air pores (not shown) with an average diameter ranging from 20 to 25 μm. A porosity of the porous filter carrier 2 ranges from 55 to 60 V %.

For each of the inflow cells 4, an exhaust gas inflow portion 4a is left open while an exhaust gas outflow portion 4b is blocked. On the other hand, for each of the outflow cells 5, an exhaust gas inflow portion 5a is blocked while an exhaust gas outflow portion 5b is left open. The inflow cells 4 and the outflows 5 are alternatively disposed so as to form a checked lattice pattern when viewed in profile. Therefore, the porous filter carrier 2 has a wall-flow structure with boundaries of each of the cells 4 and 5 as a cell division 6.

On a surface of the cell division 6 close to the inflow cell 4, there is supported a porous catalyst layer 3 composed from a composite metal oxide having a general formula of $Y_{1-x}Ag_xMn_{1-y}Ru_yO_3$ wherein $0.01 \leq x \leq 0.15$ and $0.005 \leq y \leq 0.2$. The porous catalyst layer 3 is formed to have a width ranging from 30 to 60 μm and air pores (not shown) with a diameter ranging from 0.01 to 10 μm. The porosity of the air pores varies along the width direction of the porous catalyst layer 3. Specifically, the closer it is to the surface of the porous catalyst layer 3, the greater the porosity becomes; in other words, the closer it is to the porous filter carrier 2, the smaller the porosity becomes.

Although not shown in the drawings, an outer circumferential portion of the outmost cell division 6 is provided with a metal restriction member configured to prevent the exhaust gas from flowing out.

In the oxidation catalyst device for exhaust gas purification 1, the porous catalyst layer 3 is supported only on the surface of the cell division 6 close to the inflow cell 4. It should be noted that the porous catalyst layer 3 may be supported on both surfaces of the cell division 6 close to the inflow cell 4 and the outflow cell 5; it may also be supported on wall surfaces of the air pores in the cell division 6 of the porous filter carrier 2. A SiC porous solid is used as the porous filter carrier 2 in the present embodiment, it is acceptable to use a Si—SiC porous solid as the porous filter carrier 2.

Hereinafter, descriptions will be performed on the production method of the oxidation catalyst device for exhaust gas purification 1.

First, a plurality of metal compounds which constitute the composite metal oxide to form the porous catalyst layer 3, an organic acid and water are mixed, and the obtained mixture is calcined at a temperature ranging from 200 to 400° C. for 1 to 10 hours to yield a catalyst precursor. The composite metal oxide has a general formula of $Y_{1-x}Ag_xMn_{1-y}Ru_yO_3$. Yttrium nitrate, silver nitrate, manganese nitrate and ruthenium nitrate may be given as the examples of the plurality of metal compounds. As an example of the organic acid, citric acid, malic acid and glutamic acid may be given. The calcination is performed every time when a different organic acid is used to prepare plural kinds of catalyst precursors corresponding to the different organic acids used.

Subsequently, each of the plural kinds of catalyst precursors is mixed with water and a binder, respectively, and is ground to prepare plural kinds of slurries corresponding to the different organic acids. As the binder, a sol prepared from zirconia can be used.

Thereafter, the porous filter carrier 2 having a plurality of perforated galleries which penetrate through the porous filter carrier 2 in the axial direction is prepared. The perforated galleries are arranged in the porous filter carrier 2 in a lattice pattern when viewed in profile. As the porous filter carrier 2, a SiC porous solid (trade name: MSC14) manufactured by NGK Insulators, Co., for example, can be used.

One end portion of a perforated gallery in the porous filter carrier 2 is alternatively blocked (to form into a checked lattice pattern in profile) with a ceramic adhesive having silica as its main component to form an outflow cell 5. Thereafter, one kind of slurry in the plural kinds of slurries is flown into the porous filter carrier 2 from the side at which the end portions of the perforated galleries are blocked. Accordingly, the one kind of slurry is flown through the plurality of perforated galleries whose end portions are not blocked, namely, the cells other than the outflow cells 5, and is coated on the surface of the cell division 6.

After the slurry is coated on the surface of the cell division 6, the excess slurry is eliminated from the porous filter carrier 2. Thereafter, the porous filter carrier 2 is calcined at a temperature ranging from 800 to 1000° C. for 1 to 10 hours.

The operation of coating the slurry on the surface of the cell division 6 and calcining the porous filter carrier 2 is repeated for each of the plural kinds of slurries. Thereby, the porous catalyst layer 3 composed of the composite metal compound having a general formula of $Y_{1-x}Ag_xMn_{1-y}Ru_yO_3$ (wherein $0.01 \leq x \leq 0.15$ and $0.005 \leq y \leq 0.2$) is formed on the surface of the cell division 6 of the cells other than the outflow cells 5. Since the porous catalyst layer 3 is formed from the plural kinds of slurries and each of the slurries is prepared from different organic acids, respectively, therefore, the porosity of the porous catalyst layer 3 formed from the plural kinds of slurries is different.

It is preferable that the porosity of the porous catalyst layer 3 varies in the width direction thereof, in other words, the closer it is to the side of the porous catalyst layer 3, the greater the porosity becomes; on the other hand, the closer it is to the side of the porous filter carrier 2, the smaller the porosity becomes.

The porous catalyst layer 3 can be prepared to have a porosity varying in the width direction by, for example, the following method. First, after a first slurry containing a first catalyst precursor prepared from citric acid is coated on the porous filter carrier 2, it is calcined to form a first porous catalyst layer. Subsequently, after a second slurry containing a second catalyst precursor prepared from malic acid is coated on the first catalyst layer, it is calcined to form a second porous catalyst layer. Thereafter, after a third slurry containing a third catalyst precursor prepared from glutamic acid is coated on the second catalyst layer, it is calcined to form a third porous catalyst layer.

After the porous catalyst layer 3 has been formed on the surface of the cell division 6, by blocking the exhaust gas outflow portions 4b of the cells (i.e., cells that form the inflow cells 4) other than the outflow cells 5 with a ceramic adhesive having silica as its main component, the inflow cells 4 are formed.

Hereinafter, the operation of the oxidation catalyst device for exhaust gas purification 1 produced according to the production method described above in the first embodiment will be explained with reference to FIG. 1. First, the oxidation catalyst device for exhaust gas purification 1 is disposed in such a way that the exhaust gas inflow portion 4a of the inflow cell 4 and the exhaust gas inflow portion 5a of the outflow cell 5 are located upstream of the exhaust gas from the internal combustion engine. Thereby, as illustrated in FIG. 1 with arrows, the exhaust gas is guided into the inflow cell 4 from the exhaust gas inflow portion 4a of the inflow cell 4.

At this moment, since the exhaust gas inflow portion 5a of the outflow cell 5 is blocked, it is impossible for the exhaust gas to be guided into the outflow cell 5. Note that the exhaust gas outflow portion 4b of the inflow cell 4 is also blocked.

According thereto, the exhaust gas flown into the inflow cell 4 passes through the air pores in the porous catalyst layer 3 which is supported on the surface of the cell division 6 and the air pores in the cell division 6 of the porous filter carrier 2 and enters into the outflow cell 5. When the exhaust gas passes the air pores in the porous catalyst layer 3, the particulates contained in the exhaust gas undergo contact with the surfaces of the air pores and are eliminated via combustion according to the catalyst reaction by the porous catalyst layer 3. Consequently, the exhaust gas with the particulates eliminated via combustion enters into the outflow cell 5 and is discharged from the exhaust gas outflow portion 5b.

As mentioned above, the porosity of the porous catalyst layer 3 varies in the width direction thereof, in other words, the closer it is to the side of the porous catalyst layer 3, the greater the porosity becomes; on the other hand, the closer it is to the side of the porous filter carrier 2, the smaller the porosity becomes. Thereby, the combustion performance of the particulates can be raised at a temperature below 300° C.; as a result, the low temperature oxidation (combustion) rate for the particulates can be raised.

Figure 8:
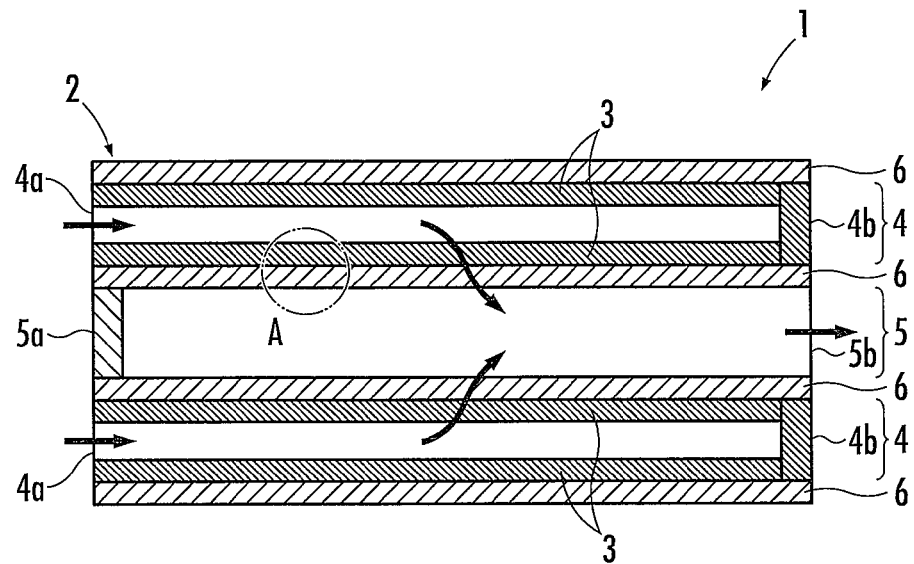
FIG. 8(a) to FIG. 8(b) are explanatory sectional diagrams illustrating a configuration of an oxidation catalyst device for exhaust gas purification obtained from a second embodiment of the production method of the present invention.
Figure 8:
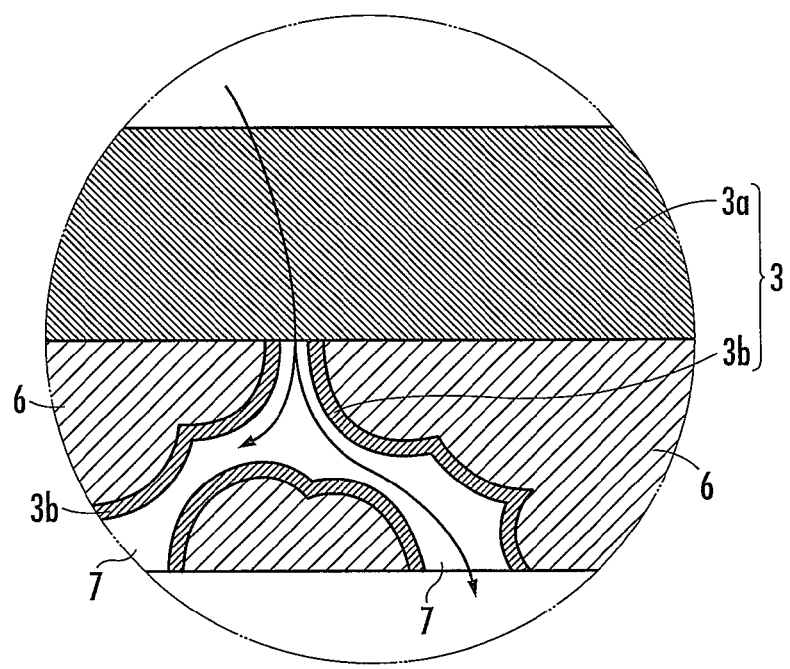

As illustrated in FIG. 8, an oxidation catalyst device for exhaust gas purification 11 produced according to a second aspect of a production method in the present embodiment includes a porous filter carrier 2 having a wall-flow structure, and a porous catalyst layer 3 supported on the porous filter carrier 2. When exhaust gas from an internal combustion engine is flown through the oxidation catalyst device for exhaust gas purification 117 the oxidation catalyst device for exhaust gas purification 11 purifies the exhaust gas by oxidizing particulates contained therein.

The porous filter carrier 2 is a substantially rectangular SiC porous solid with a plurality of perforated galleries penetrating through the porous filter carrier 2 in the axial direction disposed in a lattice pattern when viewed in profile. The porous filter carrier 2 is provided with a plurality of inflow cells 4 and outflow cells 5 formed from the perforated galleries. The porous filter carrier 2 has a plurality of air pores 7 with a diameter ranging from 1 to 100 μm. A porosity of the porous filter carrier 2 ranges from 55 to 60 V %.

For each of the inflow cells 4, an exhaust gas inflow portion 4a is left open while an exhaust gas outflow portion 4b is blocked. On the other hand, for each of the outflow cells 5, an exhaust gas inflow portion 5a is blocked while an exhaust gas outflow portion 5b is left open. The inflow cells 4 and the outflow cells 5 are alternatively disposed so as to form a checked lattice pattern when viewed in profile. Therefore, the porous filter carrier 2 has a wall-flow structure with boundaries of each of the cells 4 and 5 as a cell division 6.

As illustrated in FIG. 8(a), a first porous catalyst layer 3a is supported on a surface of the cell division 6 close to the inflow cell 4. As illustrated in FIG. 8(b), a second porous catalyst layer 3b is supported on a wall surface of the air pore 7 of the cell division 6 in the porous filter carrier 2. Either the first porous catalyst layer 3a or the second porous catalyst layer 3b is composed of a composite metal oxide $Y_{1-x}Ag_xMn_{1-y}Ru_yO_3$ (wherein $0.01 \leq x \leq 0.15$ and $0.005 \leq y \leq 0.2$) and has micropores (not shown) with a diameter ranging from 0.01 to 3.5 μm. A total porosity of the porous filter carrier 2 and the porous catalyst layers 3a and 3b ranges from 45 to 50V %.

Although not shown in the drawings, an outer circumferential portion of the outmost cell division 6 is provided with a metal restriction member configured to prevent the exhaust gas from flowing out.

In the oxidation catalyst device for exhaust gas purification 11, the first porous catalyst layer 3a is supported only on the surface of the cell division 6 close to the inflow cell 4. It should be noted that the first porous catalyst layer 3a may be supported on both surfaces of the cell division 6 close to the inflow cell 4 and the outflow cell 5. A SiC porous solid is used as the porous filter carrier 2 in the present embodiment, it is acceptable to use a Si—SiC porous solid as the porous filter carrier 2.

Hereinafter, descriptions will be performed on the production method of the oxidation catalyst device for exhaust gas purification 11.

First, a mixture of yttrium nitrate, silver nitrate, manganese nitrate, ruthenium nitrate, citric acid and water is subjected to a first calcination at a temperature ranging from 200 to 400° C. for 1 to 10 hours to yield a catalyst precursor. Next, the yielded catalyst precursor is mixed with water and a binder and is ground to prepare a slurry having particles distributed in a diameter ranging from 0.5 to 10 μm and a viscosity below 2.0 mPa·s, preferably ranging from 1.3 to 2.0 mPa·s.

Thereafter, the porous filter carrier 2 having a plurality of perforated galleries which penetrate through the porous filter carrier 2 in the axial direction (a SiC porous solid manufactured by NGK Insulators, Co., trade name: MSC14, the specifications thereof are shown in Table 1) is prepared. The perforated galleries are arranged in the porous filter carrier 2 in a lattice pattern when viewed in profile.

TABLE 1

| Dimension (mm) | 36 * 36 * 50 |
|---|---|
| Approximate Volume (mm$^3$) | 65000 |
| Air Pore Average Diameter (μm) | 20 to 25 |
| Porosity (V %) | 50 to 60 |

One end portion of a perforated gallery in the porous filter carrier 2 is alternatively blocked (to form into a checked lattice pattern in profile) with a ceramic adhesive having silica as its main component to form an outflow cell 5. Thereafter, the slurry is flown into the porous filter carrier 2 from the side at which the end portions of the perforated galleries are blocked. Accordingly, the slurry is flown through the plurality of perforated galleries whose end portions are not blocked, namely, the cells other than the outflow cells 5.

Since the slurry used herein has been adjusted to have particles distributed in the above-mentioned diameter range and the viscosity mentioned above, therefore, the slurry can enter into an air pore and be coated thereon just by flowing the slurry into the porous filter carrier 2, without the necessity to suck the slurry into the air pore, and consequently, it is impossible for the slurry to occlude the opening portion of the air pore in the porous filter carrier 2.

The porous filter carrier 2 is subjected to a second calcination at a temperature ranging from 800 to 1000° C. for 1 to 10 hours after the excess slurry is eliminated from the porous filter carrier 2. Accordingly, the first porous catalyst layer 3a composed of the composite metal oxide $Y_{1-x}Ag_xMn_{1-y}Ru_yO_3$ (wherein $0.01 \leq x \leq 0.15$ and $0.005 \leq y \leq 0.2$) is formed on the surfaces of the cell divisions 6 of the cells other than the outflow cells 5. Meanwhile, the second porous catalyst layer 3b composed of the afore-mentioned composite metal oxide is formed on the wall surfaces of the air pores 7 in the cell divisions 6. Owing to the second calcination at the temperature and time in the above mentioned range, the porous catalyst layers 3a and 3b are formed to have micropores (not shown) with a diameter ranging from 0.01 to 3.5 μm.

Thereafter, by blocking the exhaust gas outflow portions 4b of the cells (i.e., cells that form the inflow cells 4) other than the outflow cells 5 with a ceramic adhesive having silica as its main component, the inflow cells 4 are formed.

For the oxidation catalyst device for exhaust gas purification 11 obtained in this manner, the total porosity of the porous filter carrier 2 and the porous catalyst layer 3 ranges from 45 to 50V %.

Hereinafter, the operation of the oxidation catalyst device for exhaust gas purification 11 produced according to the production method described above in the second embodiment will be explained with reference to FIG. 8. First, the oxidation catalyst device for exhaust gas purification 11 is disposed in such a way that the exhaust gas inflow portion 4a of the inflow cell 4 and the exhaust gas inflow portion 5a of the outflow cell 5 are located upstream of the exhaust gas from the internal combustion engine. Thereby, as illustrated in FIG. 8(a) with arrows, the exhaust gas is guided into the inflow cell 4 from the exhaust gas inflow portion 4a of the inflow cell 4.

At this moment, since the exhaust gas inflow portion 5a of the outflow cell 5 is blocked, it is impossible for the exhaust gas to be guided into the outflow cell 5. Note that the exhaust gas outflow portion 4b of the inflow cell 4 is also blocked.

According thereto, as illustrated in FIG. 8(b), the exhaust gas flown into the inflow cell 4 passes through the air pores (not shown) in the porous catalyst layer 3a which is supported on the surface of the cell division 6 and the air pores 7 in the cell division 6 of the porous filter carrier 2 and enters into the outflow cell 5. The particulates contained in the exhaust gas undergo contacts with the first catalyst layer 3a supported on the surface of the cell division 6 and the second catalyst layer 3b supported on the wall surface of the air pores 7 and are eliminated via combustion according to the catalyst reaction by the catalyst layers 3a and 3b. Consequently, the exhaust gas with the particulates eliminated via combustion enters into the outflow cell 5 and is discharged from the exhaust gas outflow portion 5b.

Examples of the present invention and contrasts thereof will be described hereinafter.

Example 1

In the present example, the oxidation catalyst device for exhaust gas purification 1 illustrated in FIG. 1 was produced as follows.

First, yttrium nitrate, silver nitrate, manganese nitrate, ruthenium nitrate, citric acid and water were mixed at a molar ratio of 0.95:0.05:0.95:0.05:6:40 in a mortar for 15 minutes at 25° C. The mixture was calcined at 350° C. for 1 hour to yield the first catalyst precursor.

Subsequently, the first catalyst precursor obtained from calcination, water, and a commercially available water-dispersion zirconia sol serving as the binder were weighted at a weight ratio of 10:100:10, mixed and ground in a rotation ball mill at 100 rpm for 5 hours to prepare the first slurry.

Thereafter, the second slurry was prepared under the same conditions as that to prepare the first slurry except that malic acid was used as a substitute for citric acid; and the third slurry was prepared under the same conditions as that to prepare the first slurry except that glutamic acid was used as a substitute for citric acid.

Subsequently, the porous filter carrier 2 having a plurality of perforated galleries which penetrate through the porous filter carrier in the axial direction (a SiC porous solid manufactured by NGK Insulators, Co., trade name: MSC14) was prepared. The perforated galleries are arranged in the porous filter carrier 2 in a lattice pattern when viewed in profile. One end portion of a perforated gallery in the porous filter carrier 2 was alternatively blocked (to form into a checked lattice pattern in profile) with a ceramic adhesive having silica as its main component to form the outflow cell 5. Thereafter, the first slurry was flown into the SiC porous solid from the side at which the end portions of the perforated galleries are blocked. Accordingly, the first slurry was flown through the plurality of perforated galleries whose end portions are not blocked, namely, the cells other than the outflow cells 5, and was coated on the surface of the cell division 6.

After the first slurry was coated on the surface of the cell division 6, the excess slurry was eliminated from the porous filter carrier 2. Thereafter, the porous filter carrier 2 was calcined at 800° C. for 1 hour. As a result thereof, the first porous catalyst layer which is composed of $Y_{0.95}Ag_{0.05}Mn_{0.95}Ru_{0.05}O_3$ was formed to have a supported capacity of approximate 15 g/L.

Figure 2:
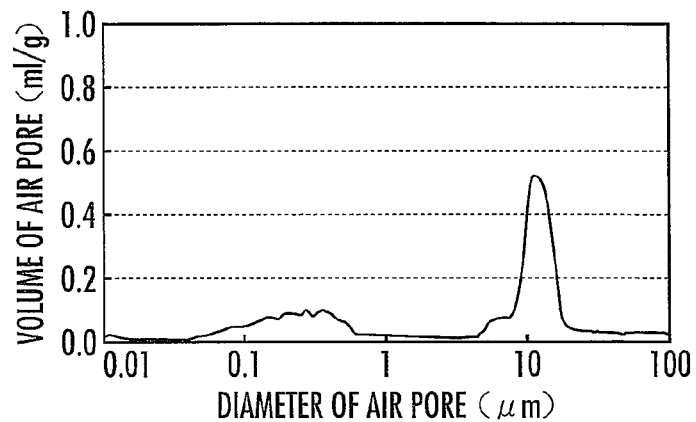
FIG. 2(a) to FIG. 2(c) are diagrams respectively illustrating diameters of air pores distributed in a porous catalyst layer made of each of slurries in the oxidation catalyst device for exhaust gas purification illustrated in FIG. 1.
Figure 2:
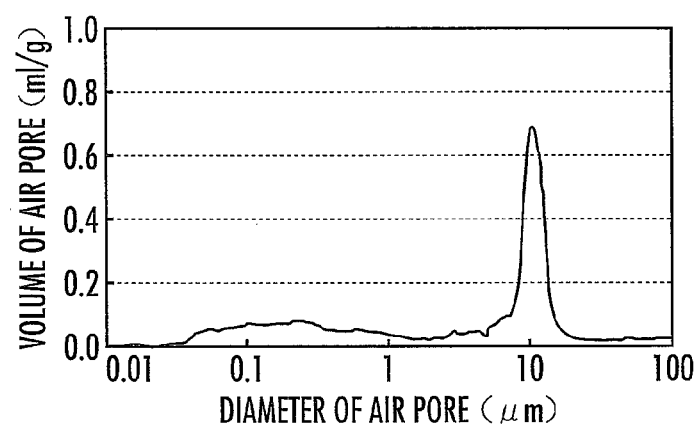
Figure 2:
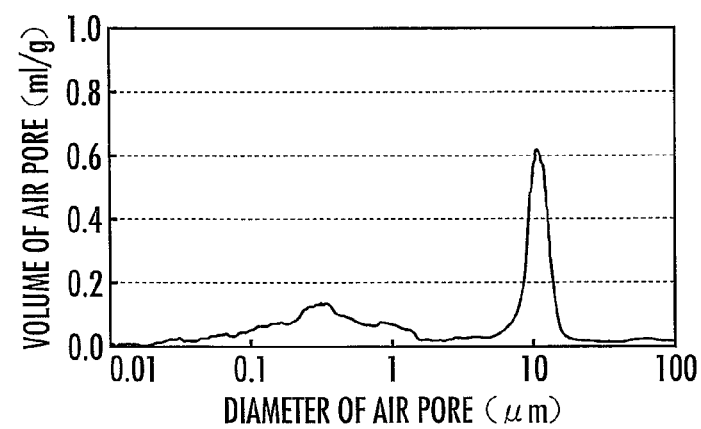
Figure 3:
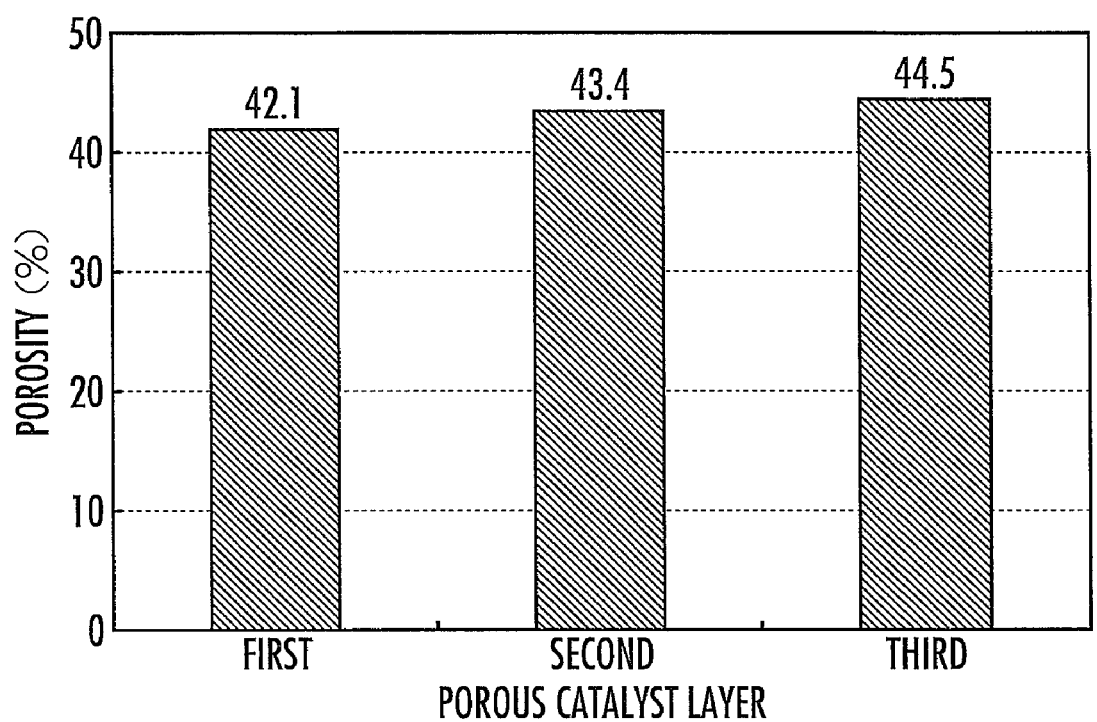
FIG. 3 is a diagram illustrating a porosity of the porous catalyst layer made of each of the slurries in the oxidation catalyst device for exhaust gas purification illustrated in FIG. 1.

Thereafter, the diameter distribution of air pores in the first porous catalyst layer and the porosity thereof were determined by using an automatic mercury porosimeter. The determination result of the diameter distribution of air pores is shown in FIG. 2(a) The porosity of the first catalyst layer was determined at 42.1%, and the result thereof is shown in FIG. 3.

Next, the second porous catalyst layer which is composed of $Y_{0.95}Ag_{0.05}Mn_{0.95}Ru_{0.05}O_3$ was formed on the first porous catalyst layer under the same conditions as that to form the first porous catalyst layer except that the second slurry was used as a substitute for the first slurry. The second porous catalyst layer was formed to have a supported capacity of approximate 40 g/L.

Thereafter, the diameter distribution of air pores in the second porous catalyst layer and the porosity thereof were determined by using an automatic mercury porosimeter. The determination result of the diameter distribution of air pores is shown in FIG. 2(b). The porosity of the first catalyst layer was determined at 43.4%, and the result thereof is shown in FIG. 3.

Next, the third porous catalyst layer which is composed of $Y_{0.95}Ag_{0.05}Mn_{0.95}Ru_{0.05}O_3$ was formed on the second porous catalyst layer under the same conditions as that to form the second porous catalyst layer except that the third slurry was used as a substitute for the second slurry. The third porous catalyst layer was formed to have a supported capacity of approximate 15 g/L.

Thereafter, the diameter distribution of air pores in the third porous catalyst layer and the porosity thereof were determined by using an automatic mercury porosimeter. The determination result of the diameter distribution of air pores is shown in FIG. 2(c). The porosity of the first catalyst layer was determined at 44.5%, and the result thereof is shown in FIG. 3.

Consequently, the first, the second and the third porous catalyst layers were sequentially laminated to form the porous catalyst layer 3 on the surface of the cell division 6. As clearly illustrated in FIG. 3, the porous catalyst layer 3 has a porosity varying in the width direction thereof, in other words, the closer it is to the outer surface thereof, the greater the porosity becomes; on the other hand, the closer it is to the side of the porous filter carrier 2, the smaller the porosity becomes.

Thereafter, the inflow cells 4 were formed by blocking the end portions of the cells other than the outflow cells 5 on the other side opposite to the side where the blocked end portions of the outflow cells 5 were blocked. According thereto, the oxidation catalyst device for exhaust gas purification 1 was obtained.

By cutting the oxidation catalyst device for exhaust gas purification 1 of the present example with a diamond cutter, 2 cubes with side length of 5 mm were prepared.

The width of the porous catalyst layer 3 was determined by using a transmission electron microscope to photograph the sectional image of the first cube prepared from the oxidation catalyst device for exhaust gas purification 1. The width of the porous catalyst layer 3 ranged from 30 to 60 μm.

Figure 4:
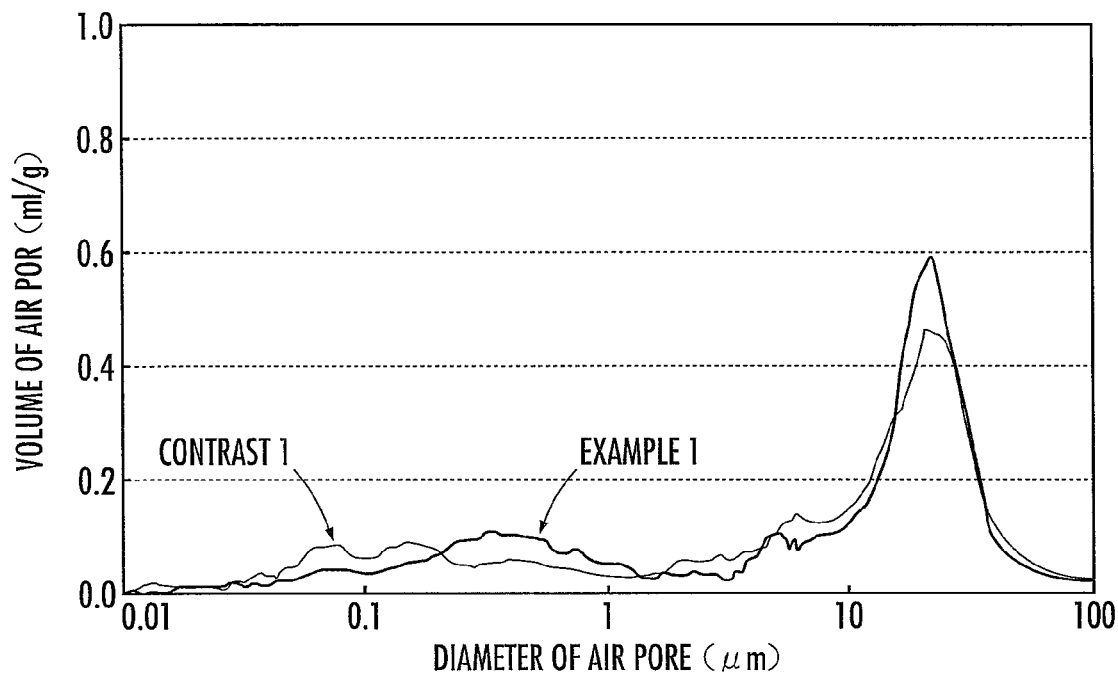
FIG. 4 is a diagram illustrating diameters of air pores distributed in the total porous catalyst layer in the oxidation catalyst device for exhaust gas purification illustrated in FIG. 1.
Figure 5:
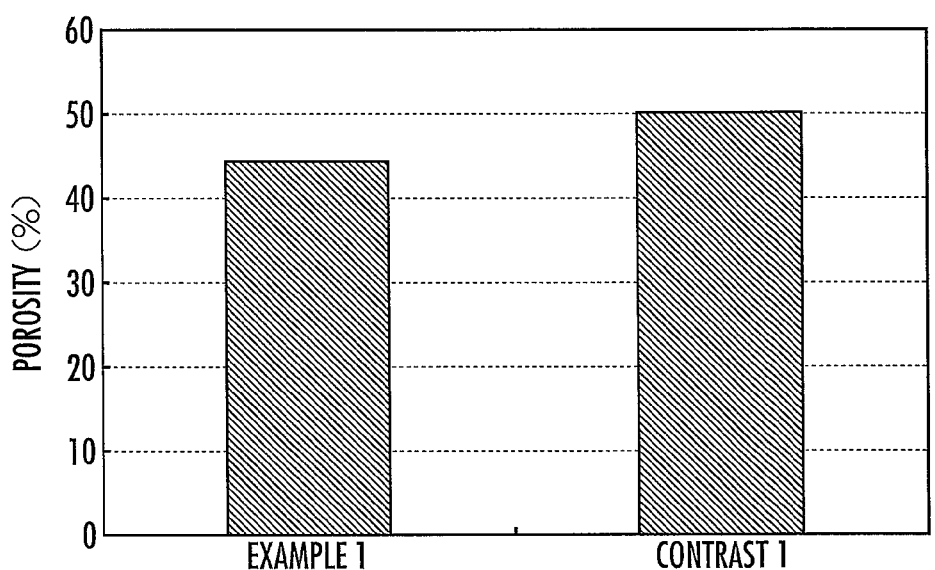
FIG. 5 is a diagram illustrating a total porosity of a porous filter carrier and the porous catalyst layer in the oxidation catalyst device for exhaust gas purification illustrated in FIG. 1.

The diameter distribution of air pores in the porous catalyst layer 3 and the total porosity of the porous filter carrier 2 and the porous catalyst layer 3 were determined by applying the automatic mercury porosimeter on the second cube prepared from the oxidation catalyst device for exhaust gas purification 1. The diameter distribution of air pores in the porous catalyst layer 3 ranged from 1 to 10 μm. The result thereof is shown in FIG. 4. The total porosity of the porous filter carrier 2 and the porous catalyst layer 3 was 44.0%. The result thereof is shown in FIG. 5.

An evaluation test of catalyst performance was performed on the oxidation catalyst device for exhaust gas purification 1 prepared according to the present example as the follows. First, the oxidation catalyst device for exhaust gas purification 1 was disposed in an exhaust system of an engine test bench mounted on a diesel engine with a cylinder capacity of 2.4 L. Then, after the diesel engine was kept working for 20 minutes under the following conditions: ambient gas containing particulates, inflow temperature of the ambient gas with relative to the oxidation catalyst device for exhaust gas purification 1: 180° C., revolution of the engine: 1500 rev/min, torque: 70 N/m, 3 grams of particulates per liter were captured approximately by the oxidation catalyst device for exhaust gas purification 1.

Figure 6:
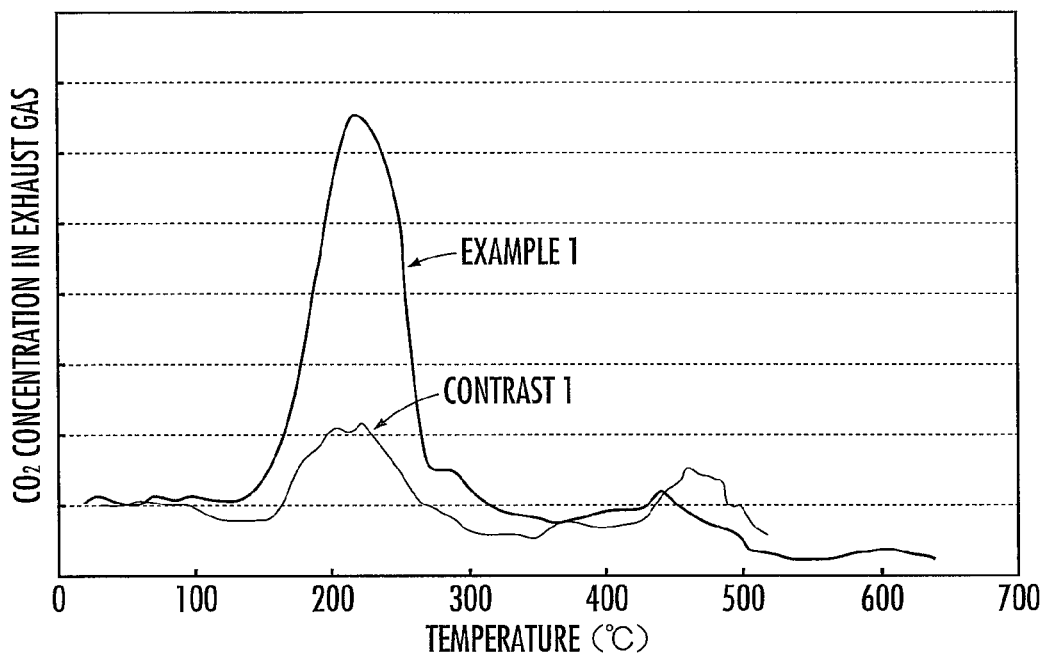
FIG. 6 is a diagram illustrating a combustion performance of particulates of the oxidation catalyst device for exhaust gas purification illustrated in FIG. 1.

Thereafter, the oxidation catalyst device for exhaust gas purification 1 captured with the particulates was removed from the exhaust system, and was fixed in a quartz tube of a flowing-type heating device. Then, while ambient gas containing oxygen and nitrogen at a volume ratio of 10:90 was supplied at a space velocity of 20000/hr from one end (supply port) of the quartz tube and discharged from the other end (discharge port) thereof, the oxidation catalyst device for exhaust gas purification 1 was heated from room temperature to 700° C. at a rate of 3° C./min by a tubular muffle furnace of the flowing-type heating device. The $CO_2$ concentration in the gas discharged from the quartz tube was determined with a mass spectrometer, and the combustion performance of particulates was obtained from the peak concentration of $CO_2$. The result thereof is shown in FIG. 6.

Figure 7:
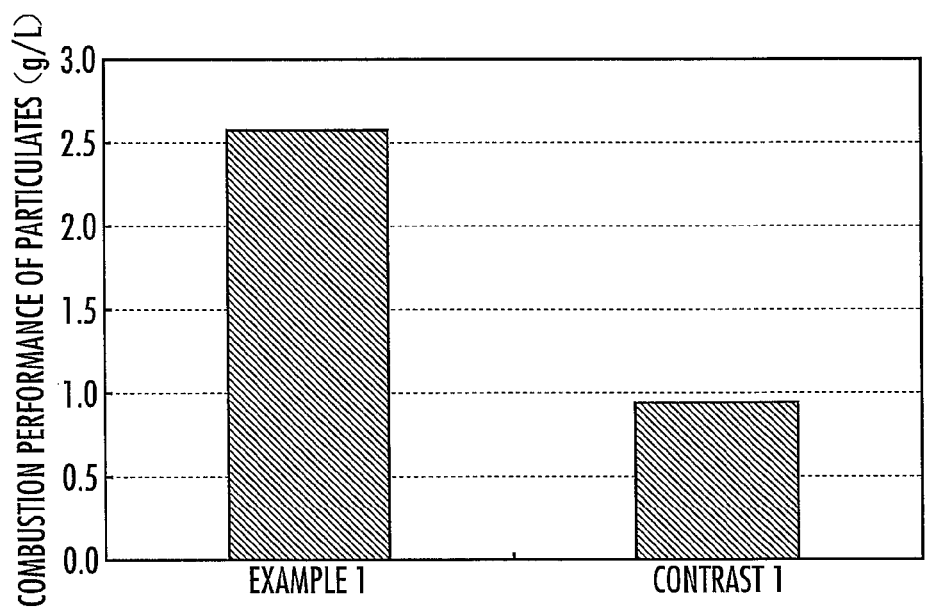
FIG. 7 is a diagram illustrating a combustion performance of particulates at a temperature below 300° C. according to the oxidation catalyst device for exhaust gas purification illustrated in FIG. 1.

The amount of particulates combusted below 300° C. calculated according to FIG. 6 was 2.6 g. The result thereof is shown in FIG. 7.

[Contrast 1]

In the present contrast, except that only the first slurry prepared in example 1 was used without using the second and third slurries, the oxidation catalyst device for exhaust gas purification 1 was produced in the same manner as example 1.

The oxidation catalyst device for exhaust gas purification 1 obtained by the present contrast, the porous catalyst layer 3 composed of the composite metal compound $Y_{0.95}Ag_{0.05}Mn_{0.95}Ru_{0.05}O_3$ is formed on the surface of the cell division 6, having a supported capacity of approximate 100 g/L.

The width of the porous catalyst layer 3 was determined by using a transmission electron microscope to photograph the sectional image of the oxidation catalyst device for exhaust gas purification 1 in the same manner as example 1. The width of the porous catalyst layer 3 ranged from 80 to 120 μm.

The diameter distribution of air pores in the porous catalyst layer 3 and the total porosity of the porous filter carrier 2 and the porous catalyst layer 3 were determined by applying the automatic mercury porosimeter on the oxidation catalyst device for exhaust gas purification 1 in the same manner as example 1. The diameter distribution of air pores in the porous catalyst layer 3 ranged from 0.02 to 5 μm. The result thereof is shown in FIG. 4. The total porosity of the porous filter carrier 2 and the porous catalyst layer 3 was 50.1%. The result thereof is shown in FIG. 5.

An evaluation test of catalyst performance was performed on the oxidation catalyst device for exhaust gas purification 1 prepared according to the present contrast in the same manner as example 1. The result thereof is shown in FIG. 6.

The amount of particulates combusted below 300° C. calculated according to FIG. 6 was 0.94 g. The result thereof is shown in FIG. 7.

It is obvious from FIG. 7 that the oxidation catalyst device for exhaust gas purification 1 having the porous catalyst layer 3 with greater porosity close to the surface thereof and smaller porosity close to the porous filter carrier 2 in the width direction thereof can combust greater amount of particulates below 300° C., and therefore can raise the low temperature oxidation (combustion) ratio of particulates, in comparison to the oxidation catalyst device for exhaust gas purification 1 having the porous catalyst layer 3 whose porosity does not vary in the width direction thereof.

Example 2

In the present example, the oxidation catalyst device for exhaust gas purification 11 was produced as follows. First, yttrium nitrate, silver nitrate, manganese nitrate, ruthenium nitrate, citric acid and water were mixed at a molar ratio of 0.95:0.05:0.95:0.05:6:40 in a mortar for 15 minutes at 25° C. The mixture was subjected to a first calcination at 400° C. for 1 hour to yield the catalyst precursor. Subsequently, the obtained catalyst precursor, water, and a commercially available water-dispersion zirconia sol serving as the binder were weighted at a weight ratio of 10:100:5, mixed and ground in a rotation ball mill at 100 rpm for 5 hours to prepare the catalyst precursor slurry.

Figure 9:
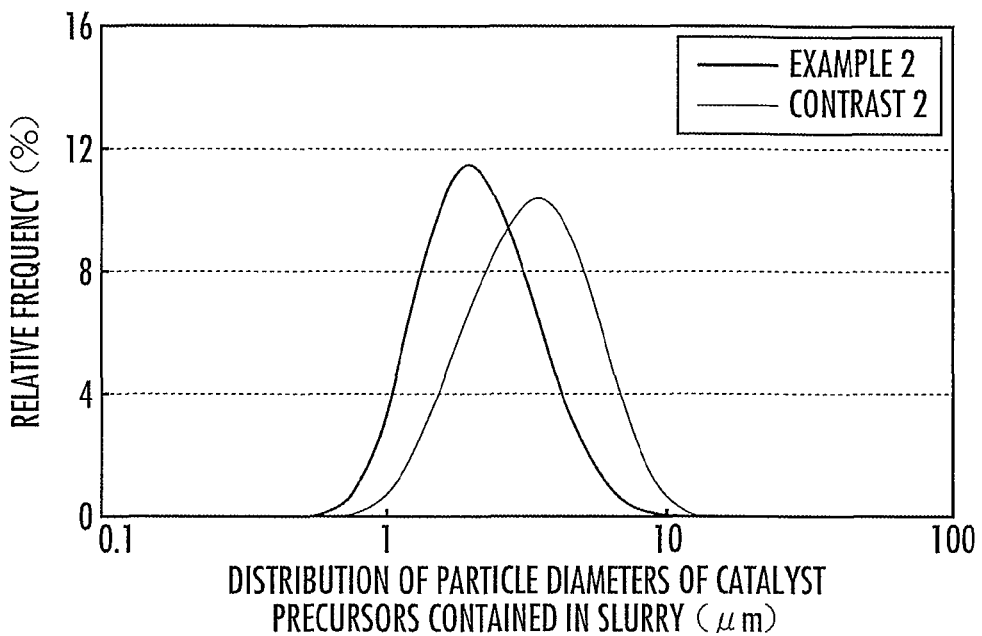
FIG. 9 is a diagram illustrating a diameter distribution of a catalyst precursor contained in a catalyst precursor slurry prepared according to example 2 and contrast 2, respectively.

Thereafter, the particle diameter distribution of the catalyst precursor contained in the catalyst precursor slurry was determined by using a laser diffraction/scattered particle size distribution determination device. The result thereof is shown in FIG. 9. As illustrated in FIG. 9, the particle diameter distribution of the catalyst precursor ranged from 0.5 to 10 μm.

Figure 10:
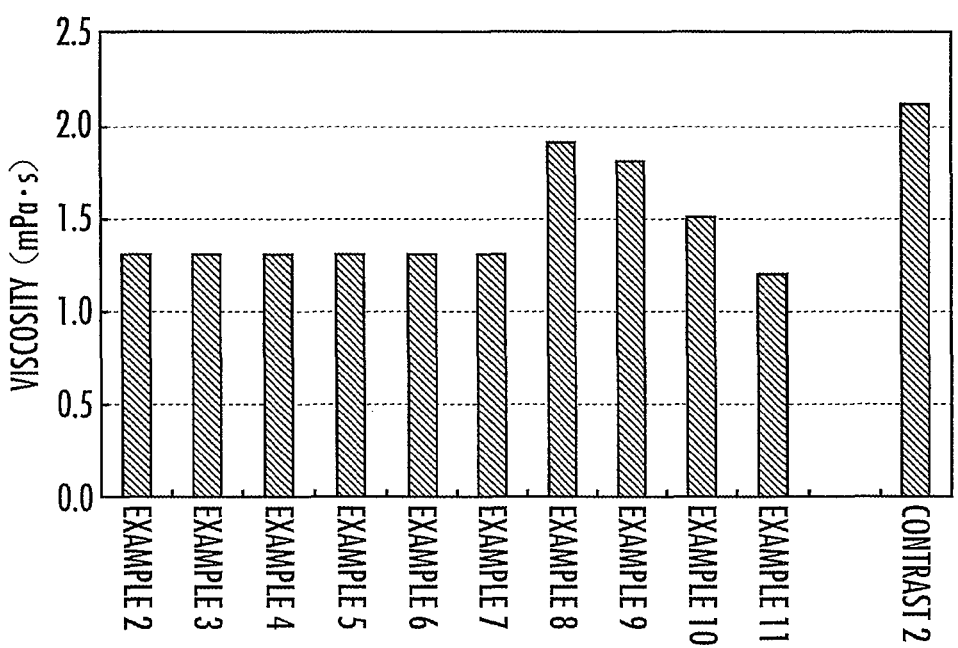
FIG. 10 is a graph illustrating a viscosity of the catalyst precursor slurry prepared according to examples 2 to 11 and contrast 2, respectively.

Next, the viscosity of the catalyst precursor slurry was determined by using a viscometer of type E. The result thereof is shown in FIG. 10. As illustrated in FIG. 10, the viscosity of the catalyst precursor slurry was 1.3 mPa·s.

Subsequently, the porous filter carrier 2 having a plurality of perforated galleries which penetrate through the porous filter carrier 2 in the axial direction (a SiC porous solid manufactured by NGK Insulators, Co., trade name: MSC14, dimension: 36 mm*36 mm*50 mm) was prepared. The perforated galleries are arranged in the porous filter carrier 2 in a lattice pattern when viewed in profile. One end portion of a perforated gallery in the porous filter carrier 2 was alternatively blocked (to form into a checked lattice pattern in profile) with a ceramic adhesive having silica as its main component to form the outflow cell 5. Thereafter, the catalyst precursor slurry was flown into the porous filter carrier 2 from the side at which the end portions of the perforated galleries are blocked. Accordingly, the catalyst precursor slurry was flown through the plurality of perforated galleries whose end portions are not blocked, namely, the cells other than the outflow cells 5. Then, the excess slurry was removed from the porous filter carrier 2.

The porous filter carrier 2 coated with the slurry was subjected to a second calcination at 800° C. for 1 hour to form the first porous catalyst layer 3a composed of the composite metal oxide $Y_{0.95}Ag_{0.05}Mn_{0.95}Ru_{0.05}O_3$ on the surfaces of the perforated galleries whose end portions are open to have a supported capacity of approximate 100 g/L. Meanwhile, the second porous catalyst layer 3b composed of the afore-mentioned composite metal oxide was formed on the wall surfaces of the air pores 7 in the cell divisions 6.

Thereafter, by blocking the exhaust gas outflow portions 4b of the cells (i.e., cells that form the inflow cells 4) other than the outflow cells 5 with a ceramic adhesive having silica as its main component, the inflow cells 4 were formed. Thus, the oxidation catalyst device for exhaust gas purification 11 was obtained.

An evaluation test of catalyst performance was performed on the oxidation catalyst device for exhaust gas purification 11 prepared according to the present example as the follows. First, the oxidation catalyst device for exhaust gas purification 11 was disposed in an exhaust system of an engine test bench mounted on a diesel engine with a cylinder capacity of 2.4 L. Then, after the diesel engine was kept working for 20 minutes under the following conditions: ambient gas containing particulates, inflow temperature of the ambient gas with relative to the oxidation catalyst device for exhaust gas purification 11: 180° C., revolution of the engine: 1500 rev/min, torque: 70 N/m, 3 grams of particulates per liter were captured approximately by the oxidation catalyst device for exhaust gas purification 11.

Figure 11:
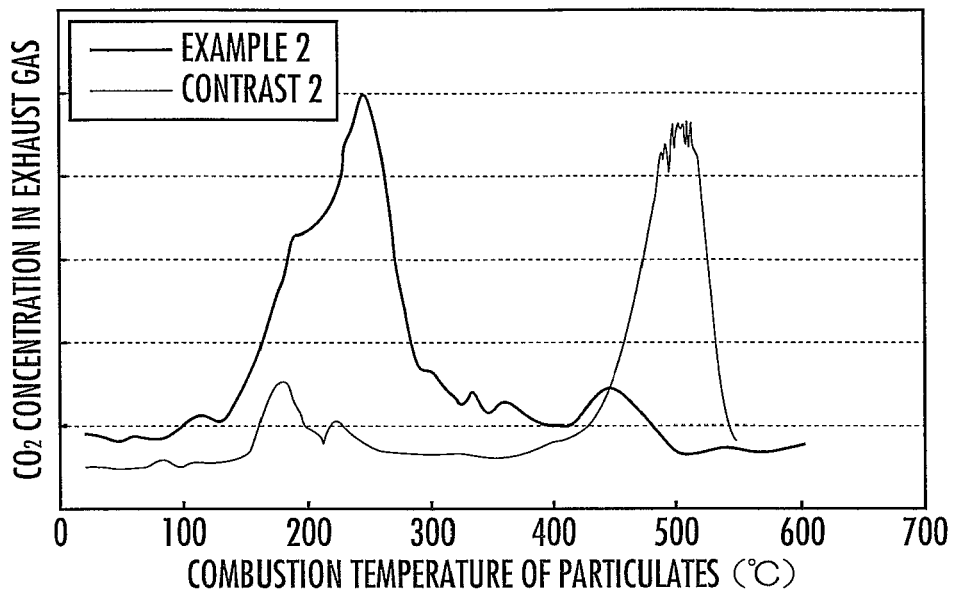
FIG. 11 is a diagram illustrating a combustion performance of particulates of the oxidation catalyst device for exhaust gas purification produced according to the production method described in example 2 and contrast 2, respectively.

Thereafter, the oxidation catalyst device for exhaust gas purification 11 captured with the particulates was removed from the exhaust system, and was fixed in a quartz tube of a flowing-type heating device. Then, while ambient gas containing oxygen and nitrogen with a volume ratio of 10:90 was supplied at a space velocity of 20000/hr from one end (supply port) of the quartz tube and discharged from the other end (discharge port) thereof, the oxidation catalyst device for exhaust gas purification 11 was heated from room temperature to 700° C. at a rate of 3° C./min by a tubular muffle furnace of the flowing-type heating device. The $CO_2$ concentration in the gas discharged from the quartz tube was determined with a mass spectrometer, and the result thereof is shown in FIG. 11. In FIG. 11, the temperature where $CO_2$ reaches the peak concentration is equivalent to the combustion temperature of the particulates.

Figure 12:
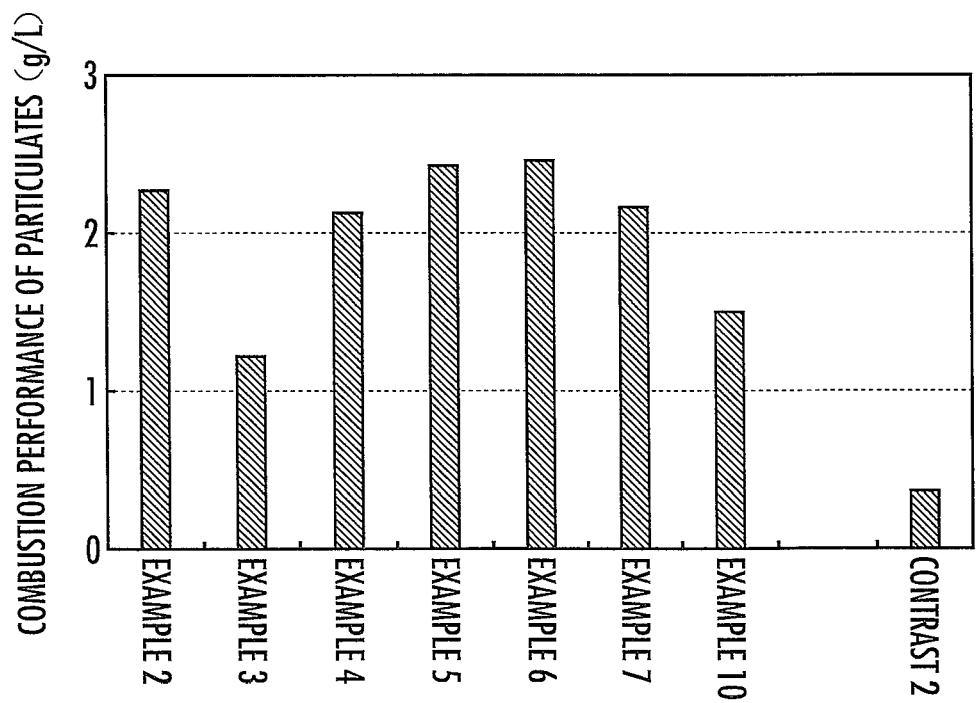
FIG. 12 is a diagram illustrating the combustion performance of particulates by the oxidation catalyst device for exhaust gas purification produced according to the production method described in example 2 to example 7, example 10 and contrast 2, respectively.

The amount of particulates combusted by the oxidation catalyst device for exhaust gas purification 11 at a temperature below 300° C. was calculated according to FIG. 11. The result thereof is shown in FIG. 12. As illustrated in FIG. 12, the combustion performance in 3 grams of particulates captured by 1 L of approximate volume of the oxidation catalyst device for exhaust gas purification 11 was 2.3 grams.

Thereafter, by cutting the oxidation catalyst device for exhaust gas purification 1 of the present example with a diamond cutter, 2 cubes with side length of 5 mm were prepared.

Figure 13:
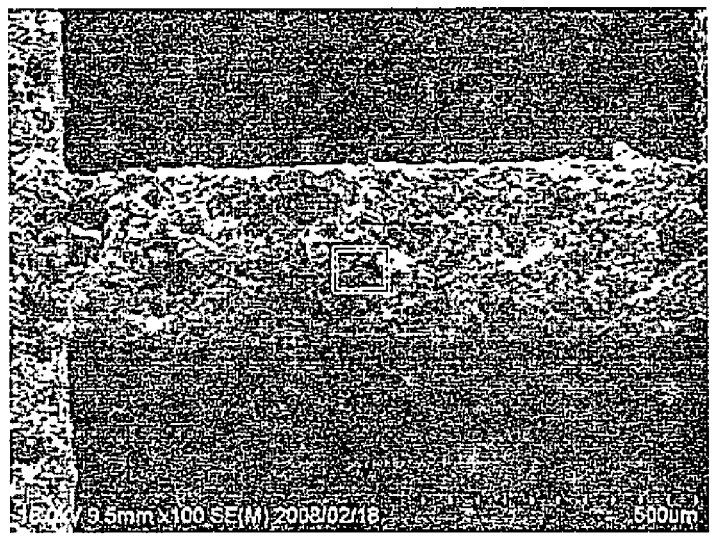
FIG. 13(a) to FIG. 13(b) are sectional diagrams of the oxidation catalyst device for exhaust gas purification produced according to the production method described in example 2.
Figure 13:
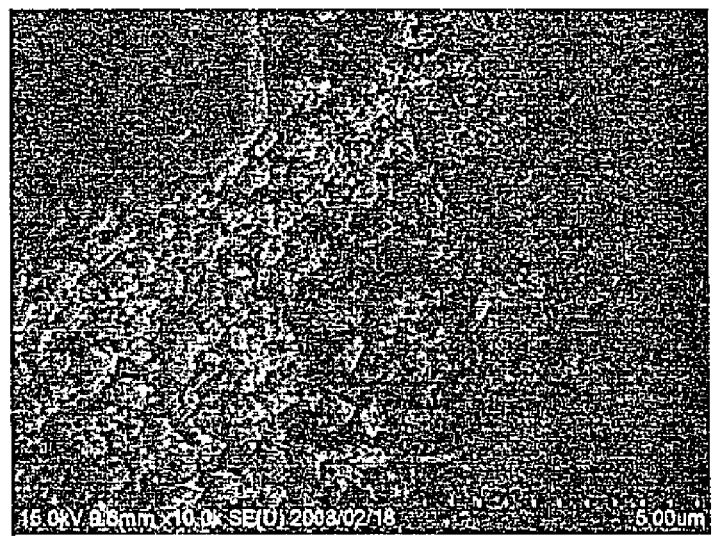

With respect to the first cube prepared from the oxidation catalyst device for exhaust gas purification 11, the sectional images thereof were photographed by using a transmission electron microscope and shown in FIGS. 13(a) and 13(b). It is obvious from FIG. 13(b) that the second porous catalyst layer 3b is formed on the wall surfaces of the air pores 7 in the cell division 6.

Subsequently, the diameters of air pores in the porous filter carrier 2, the diameters of micropores in the porous catalyst layers 3a and 3b, and the total porosity of the porous filter carrier 2 and the porous catalyst layers 3a and 3b were determined by applying the automatic mercury porosimeter on the second cube prepared from the oxidation catalyst device for exhaust gas purification 11. The results thereof are shown in FIG. 14 and FIG. 15.

Figure 14:
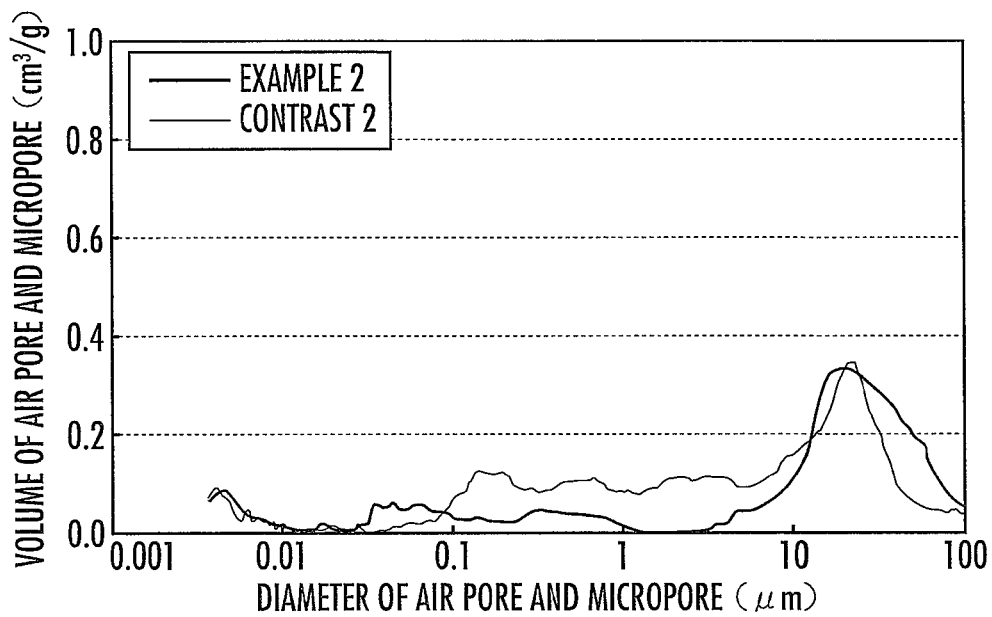
FIG. 14 is a diagram illustrating diameters of air pores distributed in the porous filter carrier and diameters of micropores distributed in the porous catalyst layer according to the oxidation catalyst device for exhaust gas purification produced according to the production method described in example 2 and contrast 2, respectively.
Figure 15:
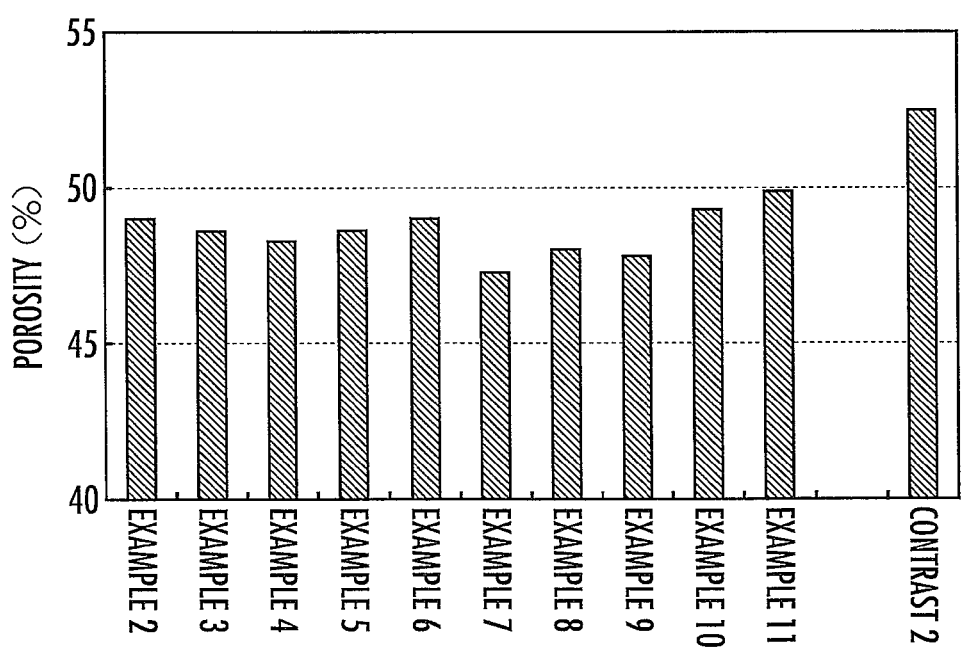
FIG. 15 is a diagram illustrating the total porosity of the porous filter carrier and the porous catalyst layer in the oxidation catalyst device for exhaust gas purification produced according to the production method described in examples 2 to 11 and contrast 2, respectively.

As illustrated in FIG. 14, the diameters of micropores in the porous catalyst layers 3a and 3b ranged from 0.01 to 2.0 μm. As illustrated in FIG. 15, the total porosity of the porous filter carrier 2 and the porous catalyst layers 3a and 3b was 49.0 V %.

Example 3

In the present example, except that the porous catalyst layers 3a and 3b were prepared to have a supported capacity of approximate 30 g/L, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 16 and FIG. 10, respectively.

Figure 16:
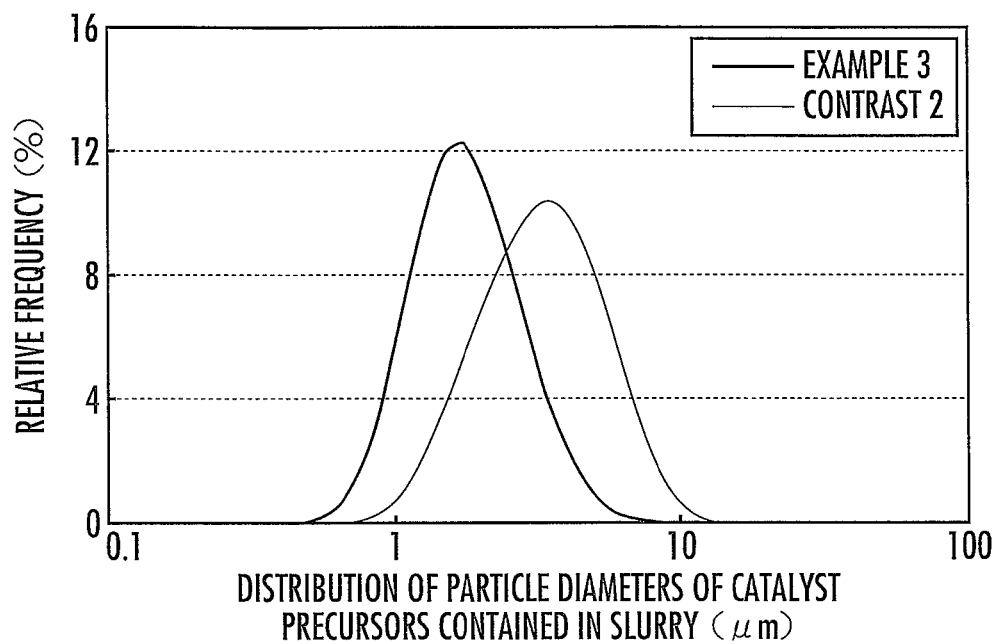
FIG. 16 is a diagram illustrating diameters of the catalyst precursors contained in the catalyst precursor slurries prepared according to the production method described in example 3 and contrast 2, respectively.

As illustrated in FIG. 16, the particle diameter distribution of the catalyst precursor ranged from 0.5 to 10 μm. As illustrated in FIG. 10, the viscosity of the catalyst precursor slurry was 1.3 mPa·s.

Figure 17:
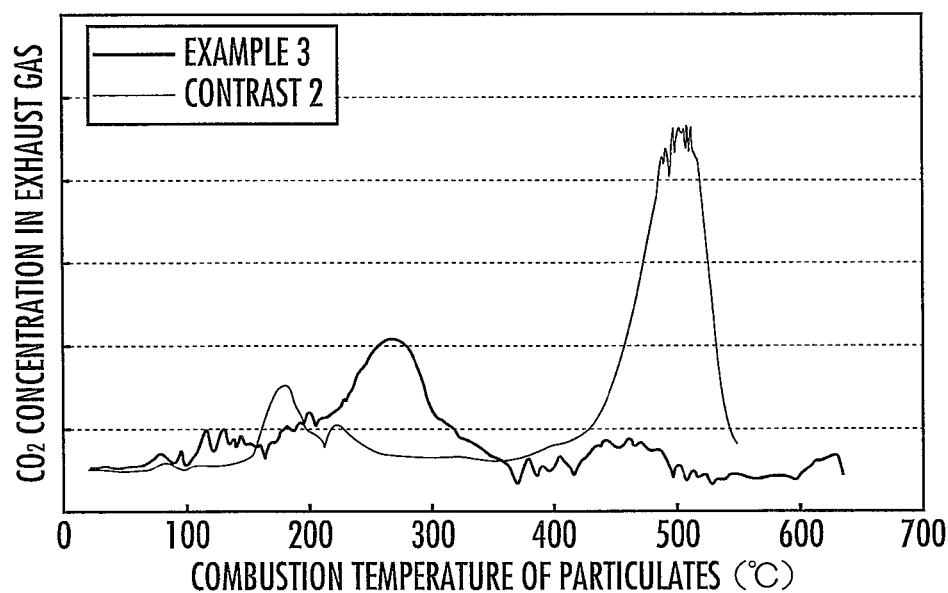
FIG. 17 is a diagram illustrating the combustion performance of particulates contained in the exhaust gas according to the oxidation catalyst device for exhaust gas purification produced according to the production method described in examples 3 and contrast 2, respectively.

An evaluation test of catalyst performance was performed on the oxidation catalyst device for exhaust gas purification 11 prepared according to the present example in the same manner as example 2 to determine the $CO_2$ concentration in the exhaust gas. The result thereof is shown in FIG. 17. Thereafter, the amount of particulates combusted by the oxidation catalyst device for exhaust gas purification 11 at a temperature below 300° C. was calculated according to FIG. 17. The result thereof is shown in FIG. 12. As illustrated in FIG. 12, the combustion performance in 3 grams of particulates captured by 1 L of approximate volume of the oxidation catalyst device for exhaust gas purification 11 was 1.2 grams.

Figure 18:
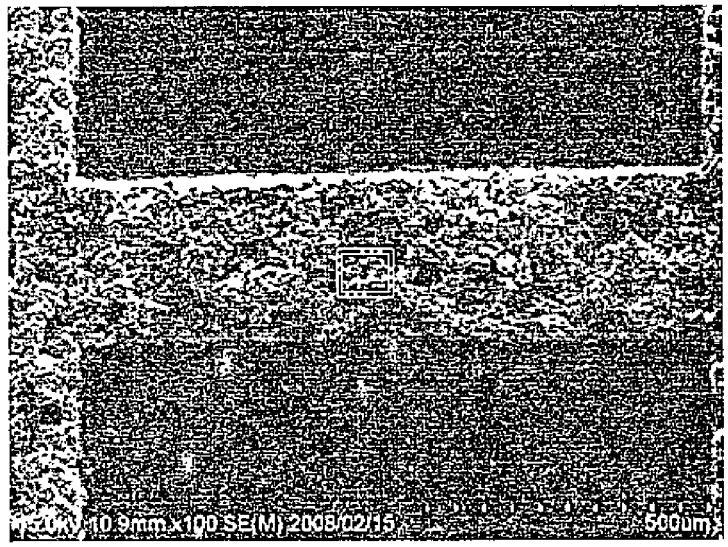
FIG. 18($a$) and FIG. 18($b$) are sectional diagrams illustrating the oxidation catalyst device for exhaust gas purification produced according to the production method described in example 3.
Figure 18:

With respect to the oxidation catalyst device for exhaust gas purification 11 prepared according to the present example, the sectional images thereof were photographed in the same manner as example 2 and shown in FIGS. 18(a) and 18(b). It is obvious from FIG. 18(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 19 and FIG. 15.

Figure 19:
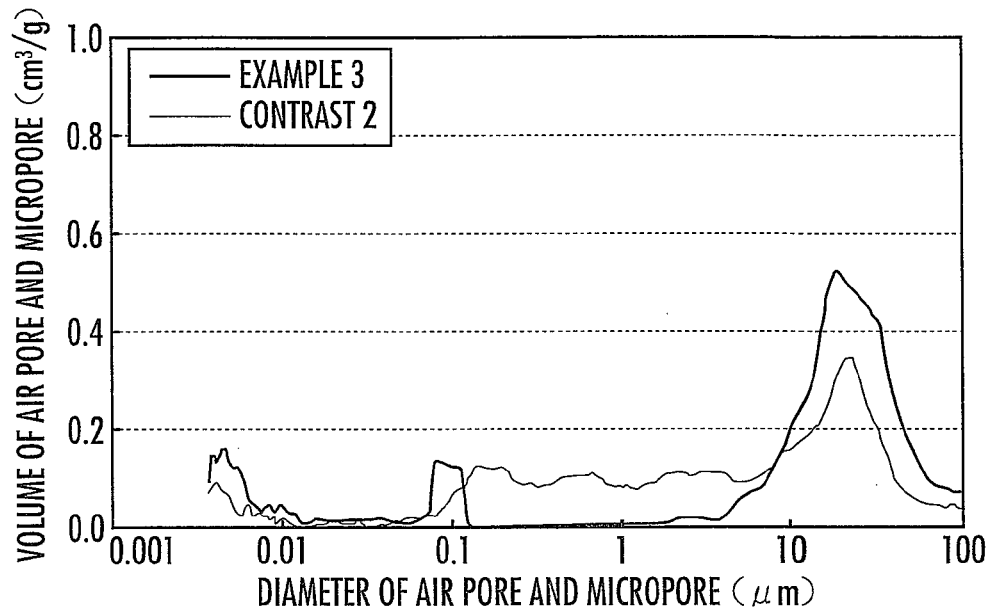
FIG. 19 is a diagram illustrating diameters of air pores distributed in the porous filter carrier and diameters of micropores distributed in the porous catalyst layer according to the oxidation catalyst device for exhaust gas purification produced according to the production method described in example 3 and contrast 2, respectively.

As illustrated in FIG. 19, the diameters of air pores in the porous catalyst layers 3a and 3b ranged from 0.05 to 0.2 μm. As illustrated in FIG. 15, the total porosity of the porous filter carrier 2 and the porous catalyst layers 3a and 3b was 48.6 V %.

Example 4

Figure 20:
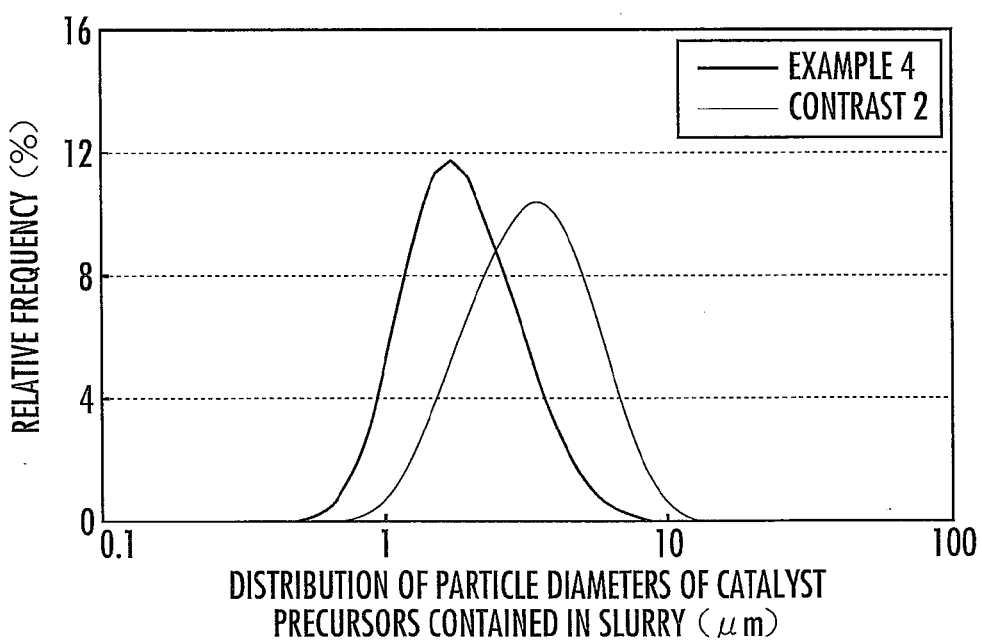
FIG. 20 is a diagram illustrating a diameter distribution of catalyst precursors contained in catalyst precursor slurries prepared according to the production method described in example 4 and contrast 2, respectively.

In the present example, except that the porous catalyst layers 3a and 3b were prepared to have a supported capacity of approximate 50 g/L, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 20 and FIG. 10, respectively. As illustrated in FIG. 20, the particle diameter distribution of the catalyst precursor ranged from 0.5 to 10 μm. As illustrated in FIG. 10, the viscosity of the catalyst precursor slurry was 1.3 mPa·s.

Figure 21:
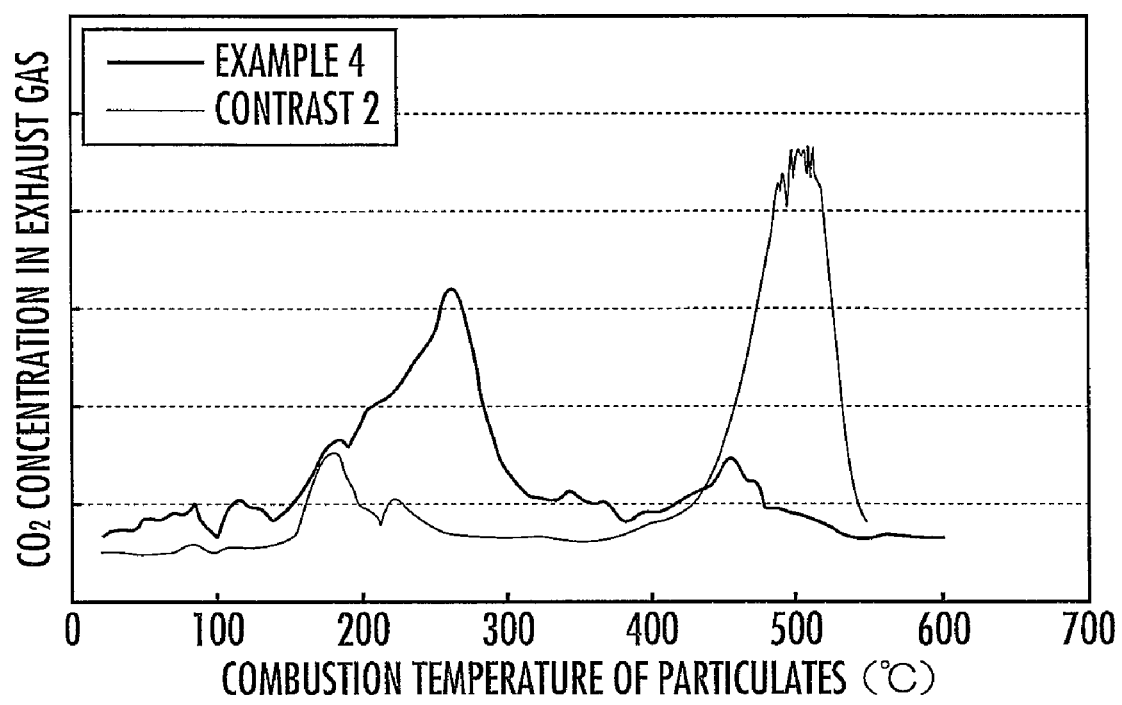
FIG. 21 is a diagram illustrating a combustion performance of particulates of the oxidation catalyst device for exhaust gas purification produced according to the production method described in example 4 and contrast 2, respectively.

An evaluation test of catalyst performance was performed on the oxidation catalyst device for exhaust gas purification 11 prepared according to the present example in the same manner as example 2 to determine the $CO_2$ concentration in the exhaust gas. The result thereof is shown in FIG. 21. Thereafter, the amount of particulates combusted by the oxidation catalyst device for exhaust gas purification 11 at a temperature below 300° C. was calculated according to FIG. 21. The result thereof is shown in FIG. 12. As illustrated in FIG. 12, the combustion performance in 3 grams of particulates captured by 1 L of approximate volume of the oxidation catalyst device for exhaust gas purification 11 was 2.1 grams.

Figure 22:
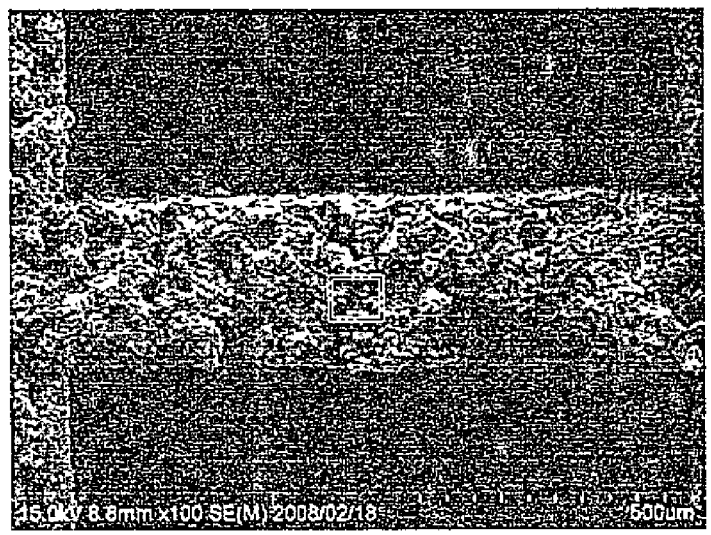
FIG. 22($a$) and FIG. 22($b$) are sectional diagrams illustrating the oxidation catalyst device for exhaust gas purification produced according to the production method described in example 4.
Figure 22:

With respect to the oxidation catalyst device for exhaust gas purification 11 prepared according to the present example, the sectional images thereof were photographed in the same manner as example 2 and shown in FIGS. 22(a) and 22(b). It is obvious from FIG. 22(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined with the same manner as example 2. The results thereof are shown in FIG. 23 and FIG. 15.

Figure 23:
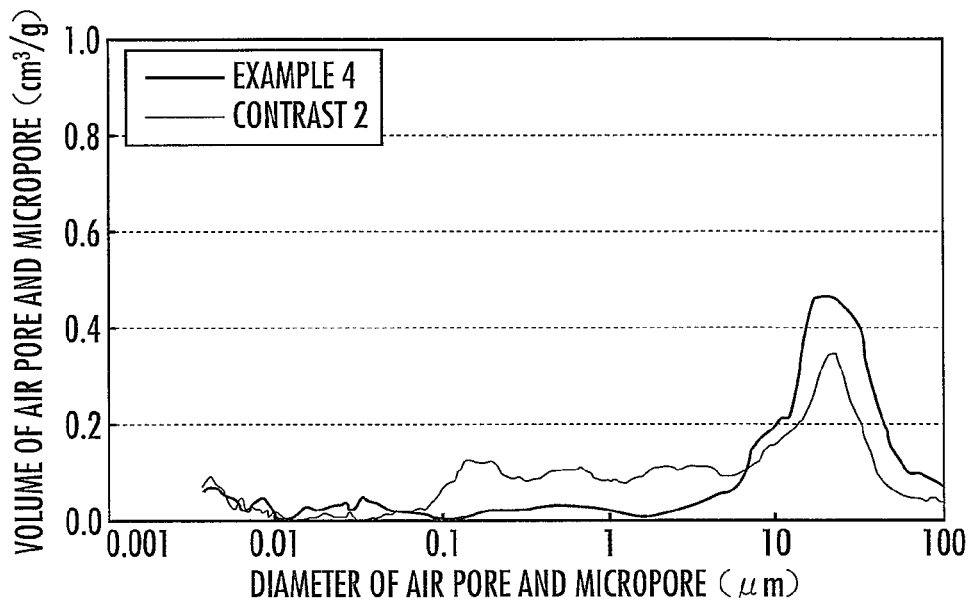
FIG. 23 is a diagram illustrating diameters of air pores distributed in the porous filter carrier and diameters of micropores distributed in the porous catalyst layer according to the oxidation catalyst device for exhaust gas purification produced according to the production method described in example 4 and contrast 2, respectively.

As illustrated in FIG. 23, the diameters of micropores in the porous catalyst layers 3a and 3b ranged from 0.01 to 2.0 μm. As illustrated in FIG. 15, the total porosity of the porous filter carrier 2 and the porous catalyst layers 3a and 3b was 48.3 V %.

Example 5

Figure 24:
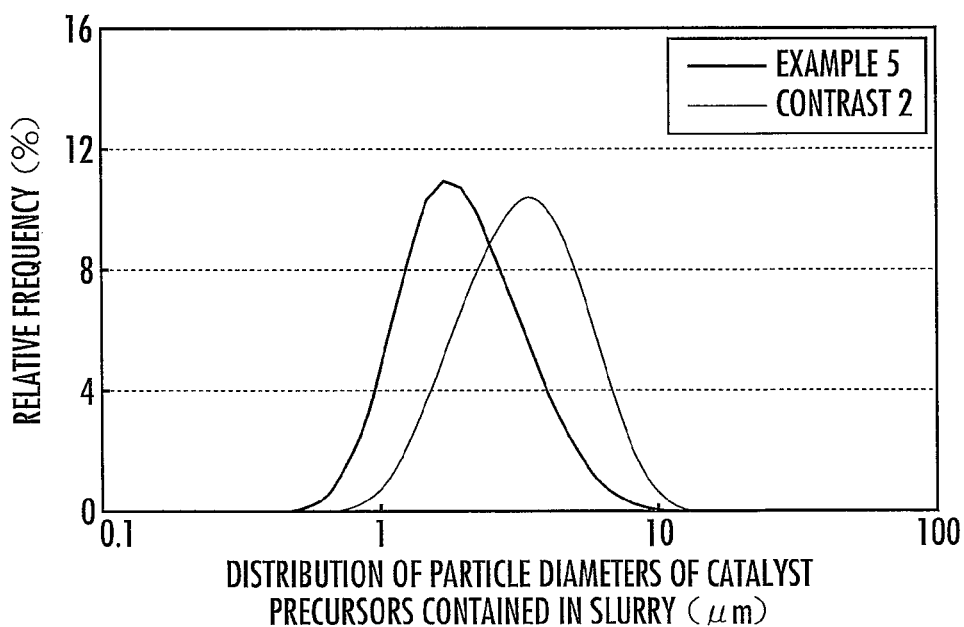
FIG. 24 is a graph illustrating diameters of the catalyst precursors contained in the slurries prepared according to the production method described in example 5 and contrast 2, respectively.

In the present example, except that the porous catalyst layers 3a and 3b were prepared to have a supported capacity of approximate 80 g/L, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 24 and FIG. 10, respectively. As illustrated in FIG. 24, the particle diameter distribution of the catalyst precursor ranged from 0.5 to 10 μm. As illustrated in FIG. 10, the viscosity of the catalyst precursor slurry was 1.3 mPa·s.

Figure 25:
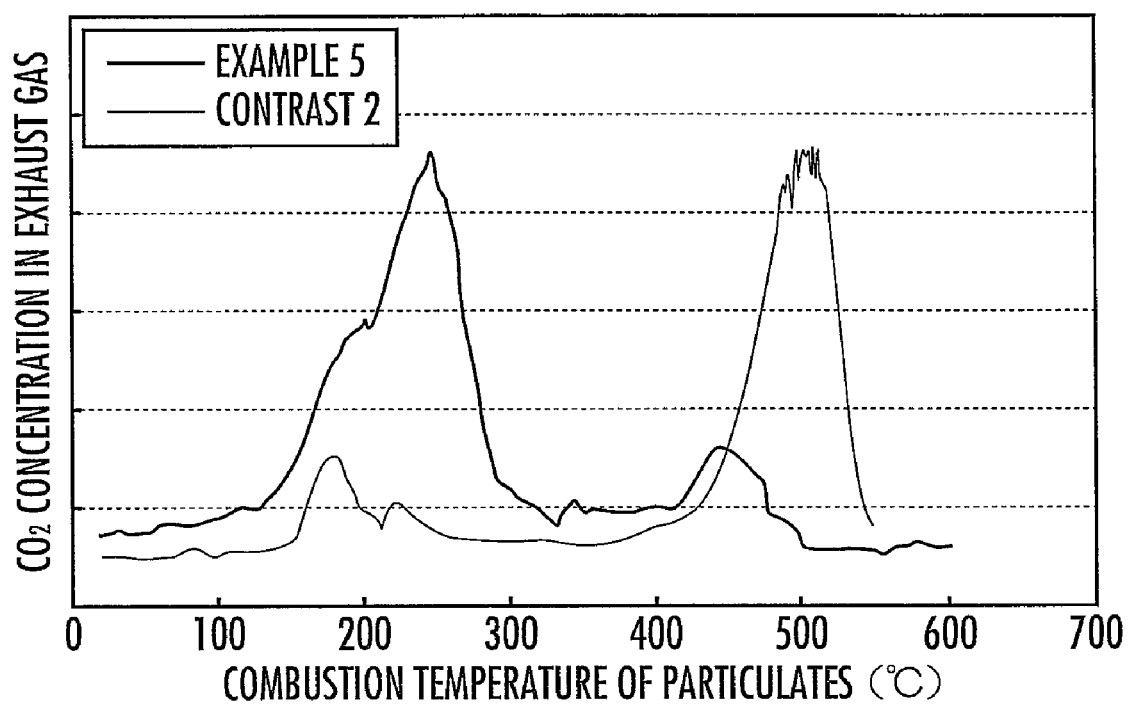
FIG. 25 is a diagram illustrating a combustion performance of particulates of the oxidation catalyst device for exhaust gas purification produced according to the production method described in example 5 and contrast 2, respectively.

An evaluation test of catalyst performance was performed on the oxidation catalyst device for exhaust gas purification 11 prepared according to the present example in the same manner as example 2 to determine the $CO_2$ concentration in the exhaust gas. The result thereof is shown in FIG. 25. Thereafter, the amount of particulates combusted by the oxidation catalyst device for exhaust gas purification 11 at a temperature below 300° C. was calculated according to FIG. 25. The result thereof is shown in FIG. 12. As illustrated in FIG. 12, the combustion performance in 3 grams of particulates captured by 1 L of approximate volume of the oxidation catalyst device for exhaust gas purification 11 was 2.4 grams.

Figure 26:
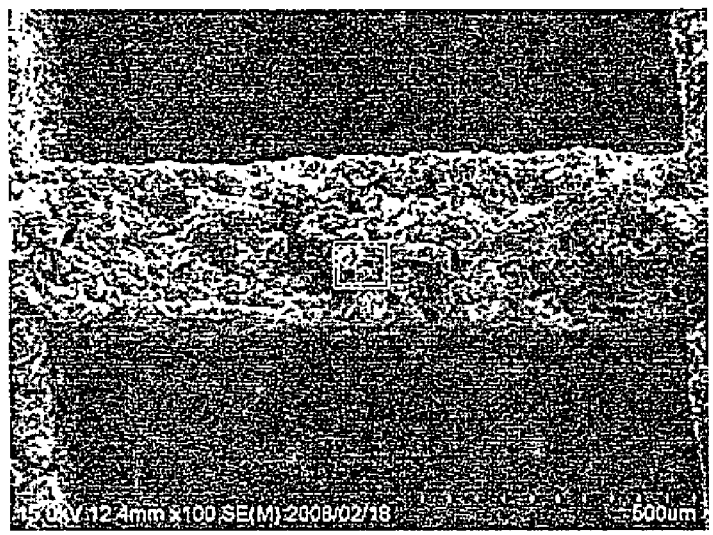
FIG. 26($a$) and FIG. 26($b$) are sectional diagrams illustrating the oxidation catalyst device for exhaust gas purification produced according to the production method described in example 5.
Figure 26:
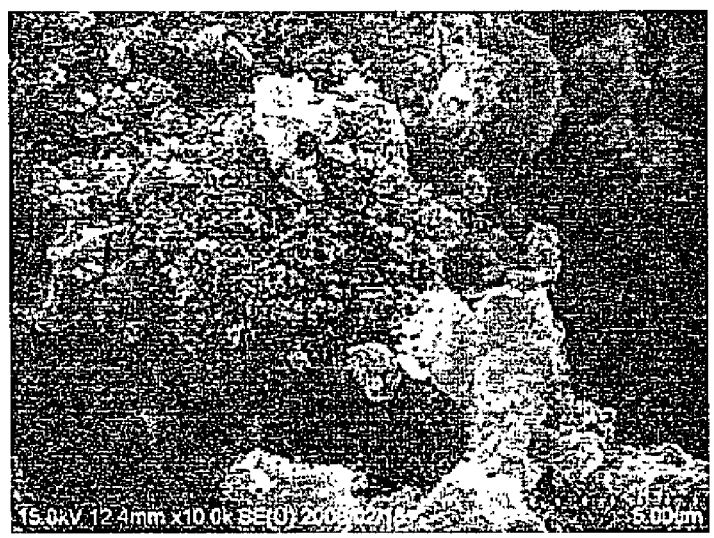

With respect to the oxidation catalyst device for exhaust gas purification 11 prepared according to the present example, the sectional images thereof were photographed in the same manner as example 2 and shown in FIGS. 26(a) and 26(b). It is obvious from FIG. 26(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 27 and FIG. 15.

Figure 27:
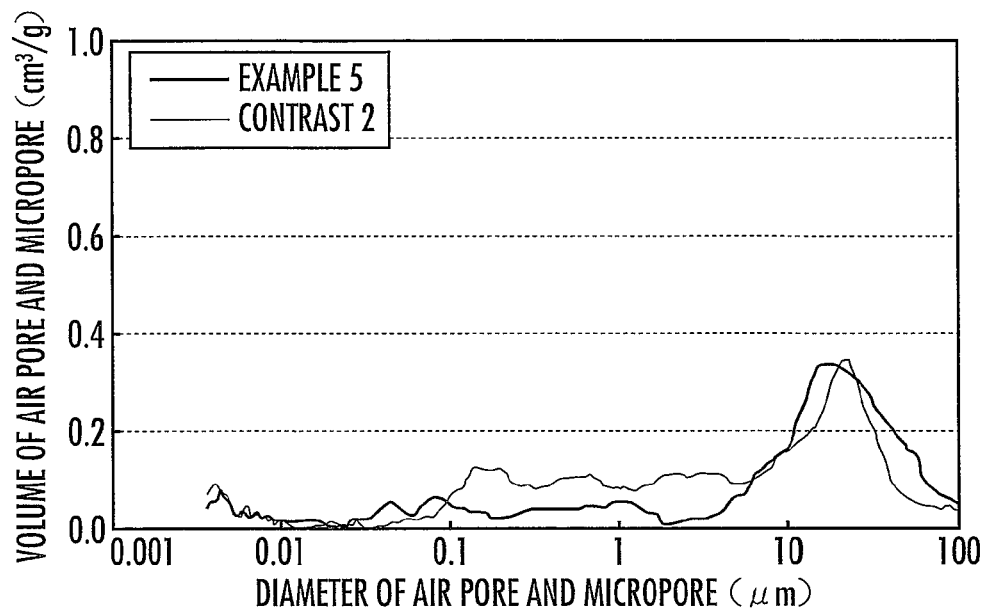
FIG. 27 is a diagram illustrating diameters of air pores distributed in the porous filter carrier and diameters of micropores distributed in the porous catalyst layer according to the oxidation catalyst device for exhaust gas purification produced according to the production method described in example 5 and contrast 2, respectively.

As illustrated in FIG. 27, the diameters of micropores in the porous catalyst layers 3a and 3b ranged from 0.01 to 2.0 μm. As illustrated in FIG. 15, the total porosity of the porous filter carrier 2 and the porous catalyst layers 3a and 3b was 48.6 V %.

Example 6

In the present example, first, yttrium nitrate, silver nitrate, manganese nitrate and ruthenium nitrate were mixed at a molar ratio of 0.95:0.05:0.95:0.05 in a mortar for 15 minutes at 25° C. The obtained mixture was dissolved in water to prepare the raw catalyst solution containing 0.1 mol/L of yttrium nitrate.

Thereafter, except that the obtained raw catalyst solution was used, the obtained raw catalyst solution was flown into the plurality of perforated galleries from the side of the porous filter carrier 2 whose the end portion is not blocked, and subsequently, the excess slurry was removed from the porous filter carrier 2 in the same manner as example 2.

The porous filter carrier 2 was subjected to a second calcination at 800° C. for 1 hour to form on the surface of the cell division 6 close to the inflow cell 4 the first porous catalyst layer 3a composed of the composite metal oxide $Y_{0.95}Ag_{0.05}Mn_{0.95}Ru_{0.05}O_3$ to have a supported capacity of approximate 10 g/L on the surfaces of the perforated galleries whose end portions are open. Meanwhile, the second porous catalyst layer 3b composed of the afore-mentioned composite metal oxide was formed on the wall surfaces of the air pores 7 in the cell divisions 6.

Thereafter, yttrium nitrate, silver nitrate, manganese nitrate, ruthenium nitrate, citric acid and water were mixed at a molar ratio of 0.95:0.05:0.95:0.05:6:40 in a mortar for 15 minutes at 25° C. The obtained mixture was subjected to a first calcination at 400° C. for 1 hour to yield the catalyst precursor. Subsequently, the obtained catalyst precursor, water, and a commercially available water-dispersion zirconia sol serving as the binder were weighted at a weight ratio of 10:100:5, mixed and ground in a rotation ball mill at 100 rpm for 5 hours to prepare the catalyst precursor slurry.

Figure 28:
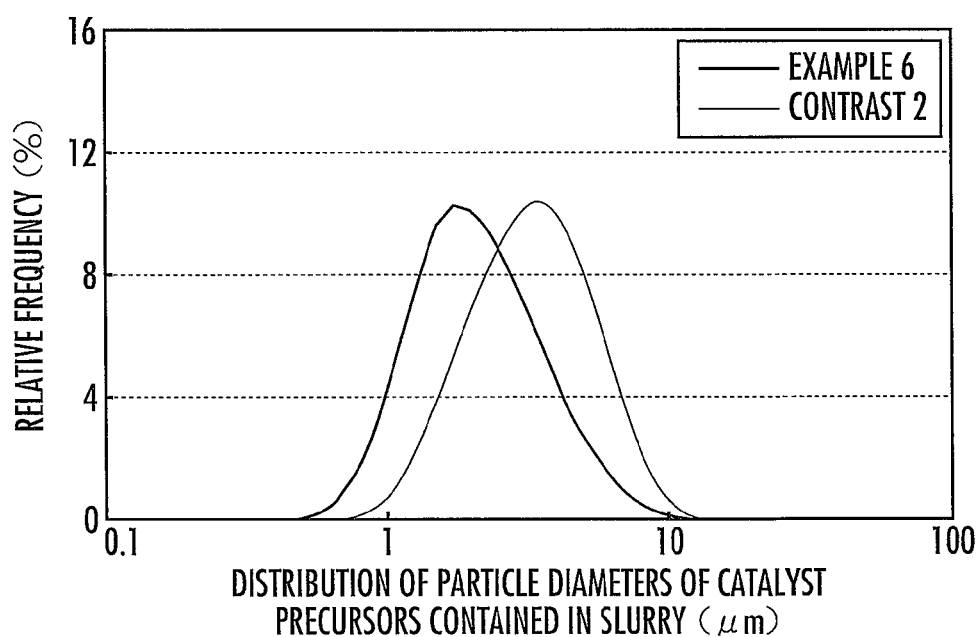
FIG. 28 is a graph illustrating diameters of the catalyst precursors contained in the slurries prepared according to the production method described in example 6 and contrast 2, respectively.

The particle diameter distribution of the catalyst precursor contained in the catalyst precursor slurry was determined in the same manner as example 2. The result thereof is shown in FIG. 28. As illustrated in FIG. 28, the particle diameter distribution of the catalyst precursor ranged from 0.5 to 1.0 μm.

The viscosity of the catalyst precursor slurry was determined in the same manner as example 2. The result thereof is shown in FIG. 10. As illustrated in FIG. 10, the viscosity of the catalyst precursor slurry was 1.3 mPa·s.

Thereafter, except that porous filter carrier 2 formed with the porous catalyst layers 3a and 3b with a supported capacity of approximate 10 g/L was used, the catalyst precursor slurry was flown into the plurality of perforated galleries from the side of the porous filter carrier 2 whose the end portion is not blocked, and subsequently, the excess slurry was removed from the porous filter carrier 2 in the same manner as example 2.

The porous filter carrier 2 was subjected to a third calcination at 800° C. for 1 hour to form on the surface of the cell division 6 close to the inflow cell 4 the first porous catalyst layer 3a composed of the composite metal oxide $Y_{0.95}Ag_{0.05}Mn_{0.95}Ru_{0.05}O_3$ to have a supported capacity of approximate 50 g/L on the surfaces of the perforated galleries whose end portions are open. Meanwhile, the second porous catalyst layer 3b composed of the afore-mentioned composite metal oxide was formed on the wall surfaces of the air pores 7 in the cell divisions 6. Herein, 50 g/L of the supported capacity has 10 g/L of the supported capacity owing to the second calcination included therein.

Thereafter, by blocking the exhaust gas outflow portions 4b of the cells (i.e., cells that form the inflow cells 4) other than the outflow cells 5 with a ceramic adhesive having silica as its main component, the inflow cells 4 were formed. Thus, the oxidation catalyst device for exhaust gas purification 11 was obtained.

Figure 29:
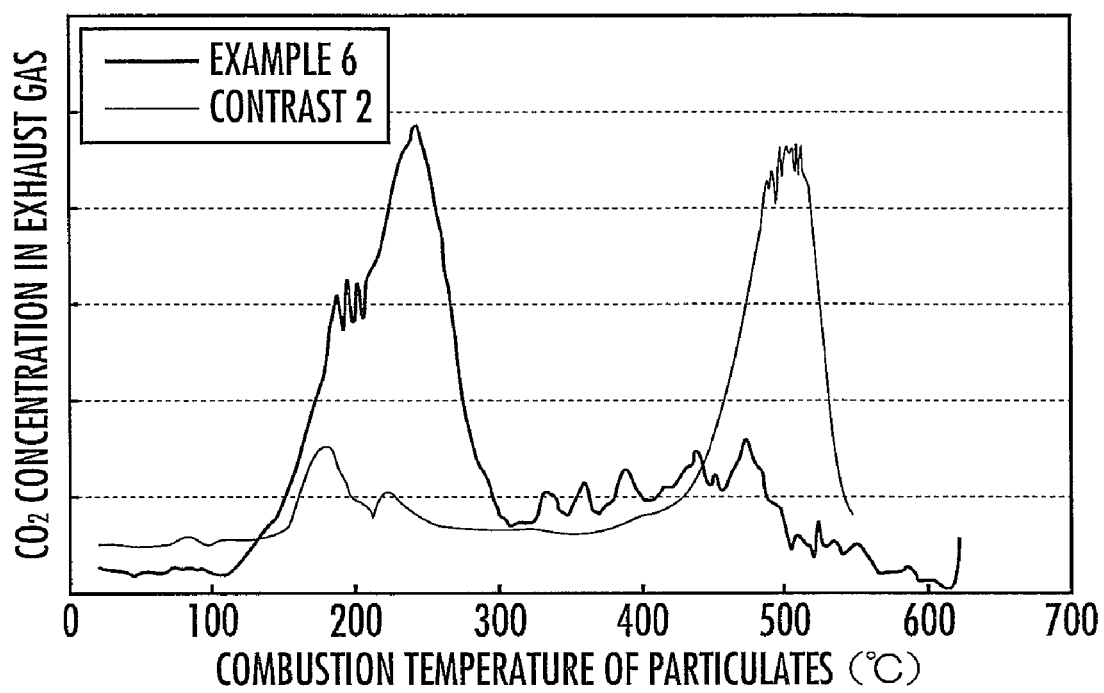
FIG. 29 is a diagram illustrating a combustion performance of particulates of the oxidation catalyst device for exhaust gas purification produced according to the production method described in example 6 and contrast 2, respectively.

An evaluation test of catalyst performance was performed on the oxidation catalyst device for exhaust gas purification 11 prepared according to the present example in the same manner as example 2 to determine the $CO_2$ concentration in the exhaust gas. The result thereof is shown in FIG. 29. Thereafter, the amount of particulates combusted by the oxidation catalyst device for exhaust gas purification 11 at a temperature below 300° C. was calculated according to FIG. 29. The result thereof is shown in FIG. 12. As illustrated in FIG. 12, the combustion performance in 3 grams of particulates captured by 1 L of approximate volume of the oxidation catalyst device for exhaust gas purification 11 was 2.5 grams.

Figure 30:
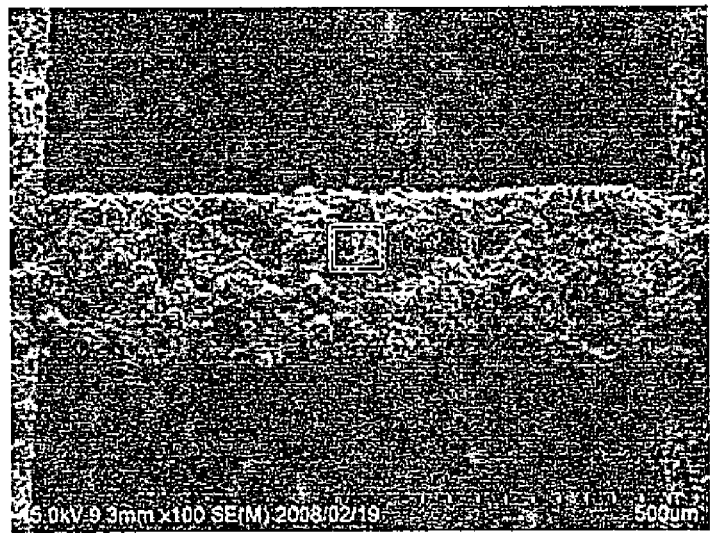
FIG. 30($a$) and FIG. 30($b$) are sectional diagrams illustrating the oxidation catalyst device for exhaust gas purification produced according to the production method described in example 6.
Figure 30:

With respect to the oxidation catalyst device for exhaust gas purification 11 prepared according to the present example, the sectional images thereof were photographed in the same manner as example 2 and shown in FIGS. 30(a) and 30(b). It is obvious from FIG. 30(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 31 and FIG. 15.

Figure 31:
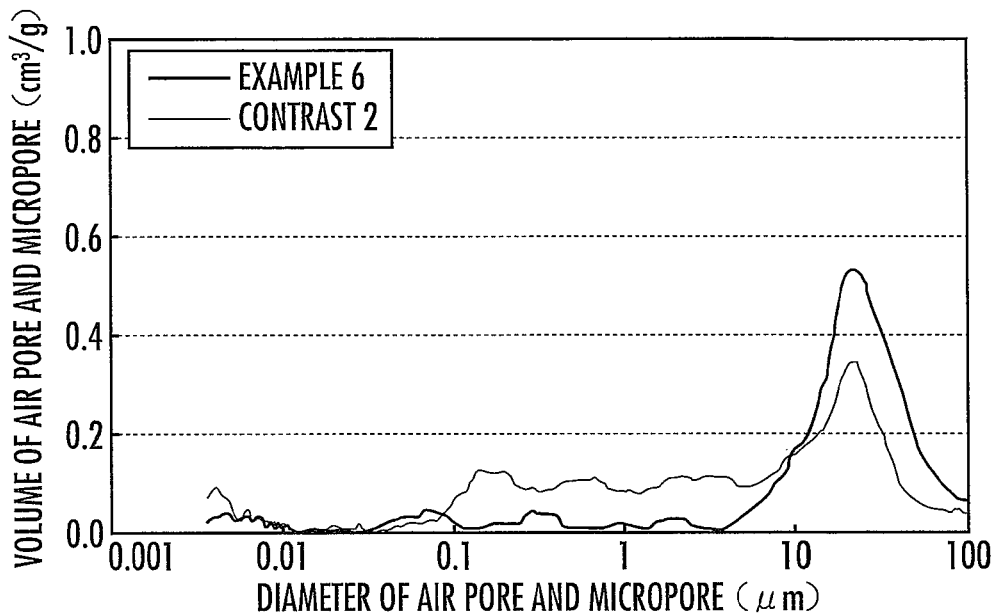
FIG. 31 is a diagram illustrating diameters of air pores distributed in the porous filter carrier and diameters of micropores distributed in the porous catalyst layer according to the oxidation catalyst device for exhaust gas purification produced according to the production method described in example 6 and contrast 2, respectively.

As illustrated in FIG. 31, the diameters of micropores in the porous catalyst layers 3a and 3b ranged from 0.03 to 2.5 μm. As illustrated in FIG. 15, the total porosity of the porous filter carrier 2 and the porous catalyst layers 3a and 3b was 49.0 V %.

Example 7

Figure 32:
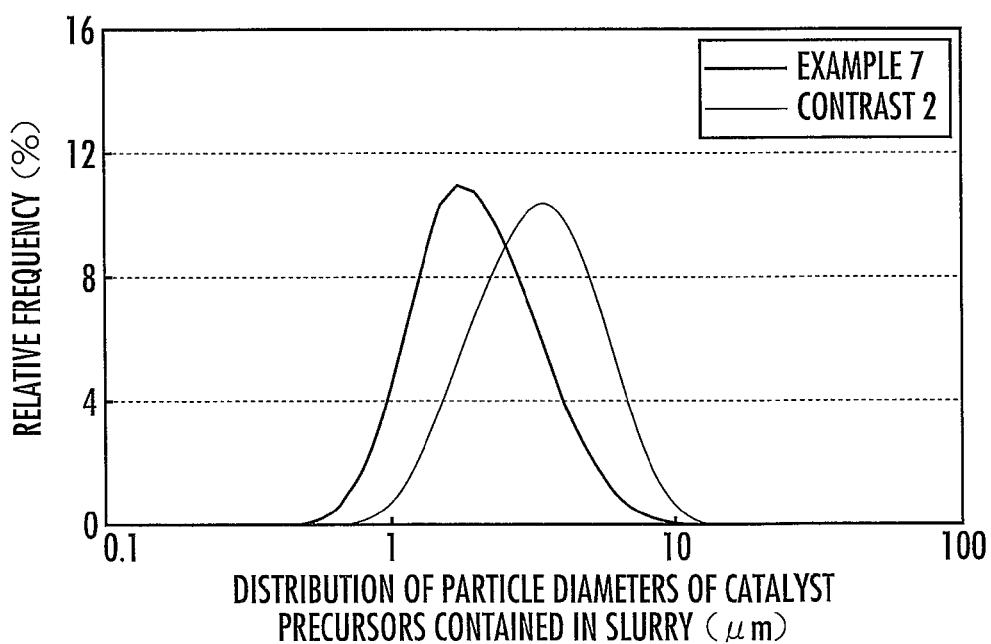
FIG. 32 is a graph illustrating diameters of the catalyst precursors contained in the slurries prepared according to the production method described in example 7 and contrast 2, respectively.

In the present example, except that the porous catalyst layers 3a and 3b were prepared to have a supported capacity of approximate 80 g/L according to the third calcination, the oxidation catalyst device for exhaust gas purification 11 was produced in the same manner as example 6. The particle diameter distribution of the catalyst precursor contained in the catalyst precursor slurry and the viscosity of the catalyst precursor slurry were determined during production in the same manner as example 2. The results thereof are shown in FIG. 32 and FIG. 10, respectively. As illustrated in FIG. 32, the particle diameter distribution of the catalyst precursor ranged from 0.5 to 10 μm. As illustrated in FIG. 10, the viscosity of the catalyst precursor slurry was 1.3 mPa·s.

Figure 33:
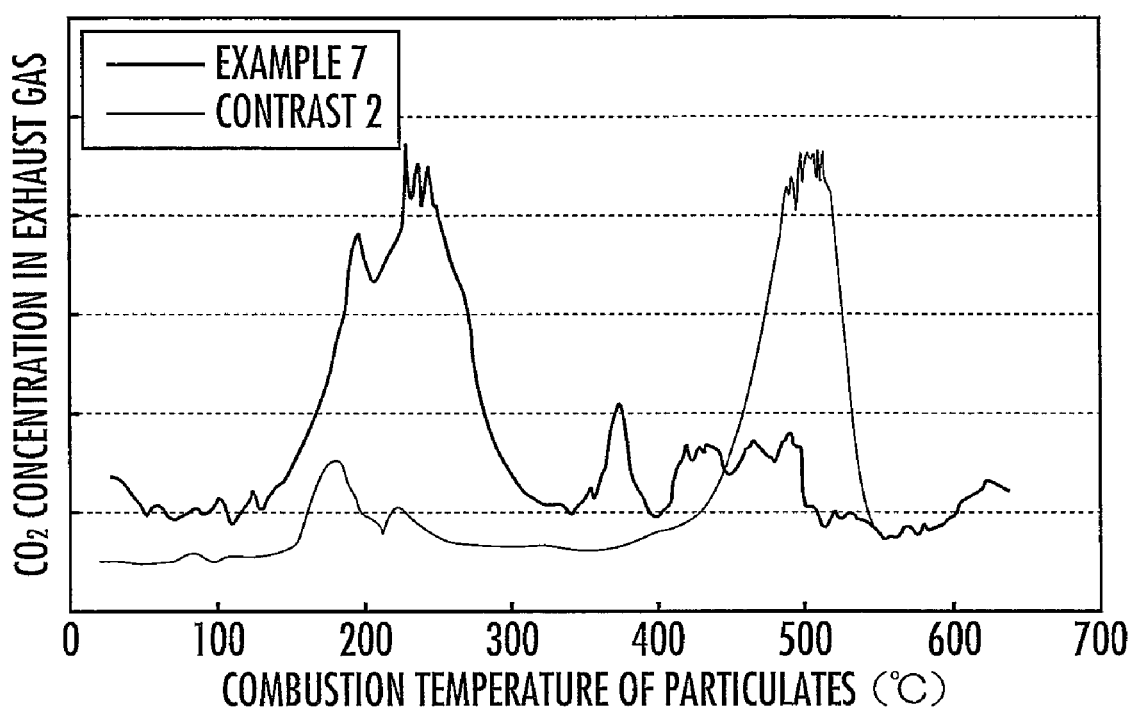
FIG. 33 is a diagram illustrating a combustion performance of particulates of the oxidation catalyst device for exhaust gas purification produced according to the production method described in example 7 and contrast 2, respectively.

An evaluation test of catalyst performance was performed on the oxidation catalyst device for exhaust gas purification 11 prepared according to the present example in the same manner as example 2 to determine the $CO_2$ concentration in the exhaust gas. The result thereof is shown in FIG. 33. Thereafter, the amount of particulates combusted by the oxidation catalyst device for exhaust gas purification 11 at a temperature below 300° C. was calculated according to FIG. 33. The result thereof is shown in FIG. 12. As illustrated in FIG. 12, the combustion performance in 3 grams of particulates captured by 1 L of approximate volume of the oxidation catalyst device for exhaust gas purification 11 was 2.2 grams.

Figure 34:
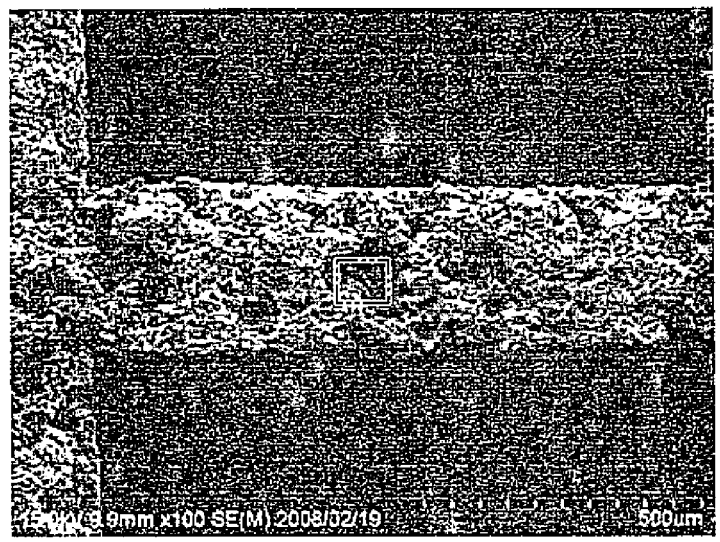
FIG. 34($a$) and FIG. 34($b$) are sectional diagrams illustrating the oxidation catalyst device for exhaust gas purification produced according to the production method described in example 7.
Figure 34:

With respect to the oxidation catalyst device for exhaust gas purification 11 prepared according to the present example, the sectional images thereof were photographed in the same manner as example 2 and shown in FIGS. 34(a) and 34(b). It is obvious from FIG. 34(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores 7 in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 35 and FIG. 15.

Figure 35:
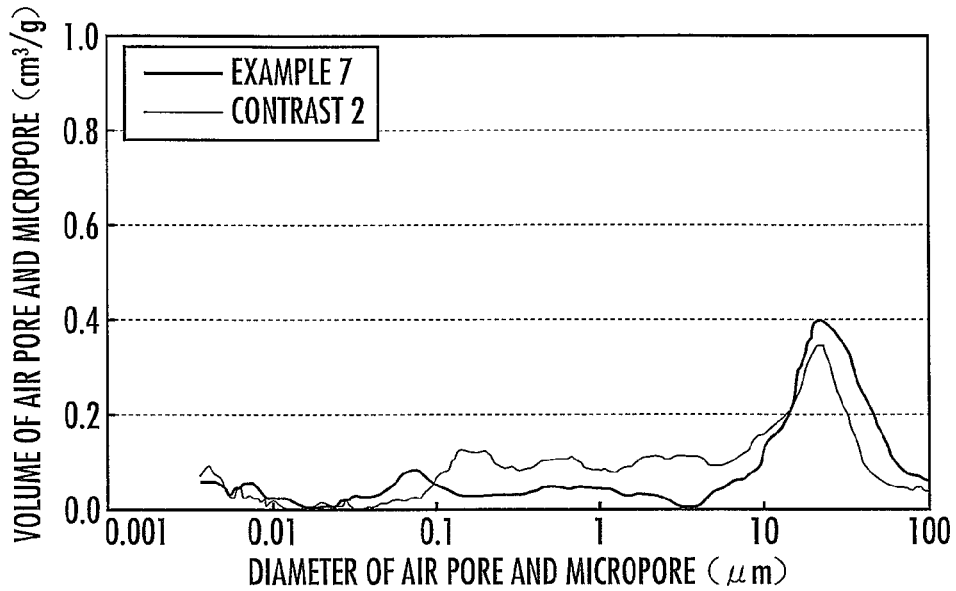
FIG. 35 is a diagram illustrating diameters of air pores distributed in the porous filter carrier and diameters of micropores distributed in the porous catalyst layer according to the oxidation catalyst device for exhaust gas purification produced according to the production method described in example 7 and contrast 2, respectively.

As illustrated in FIG. 35, the diameters of air pores in the porous catalyst layers 3a and 3b ranged from 0.02 to 3.5 µm. As illustrated in FIG. 15, the total porosity of the porous filter carrier 2 and the porous catalyst layers 3a and 3b was 47.3 V %.

Example 8

Figure 36:
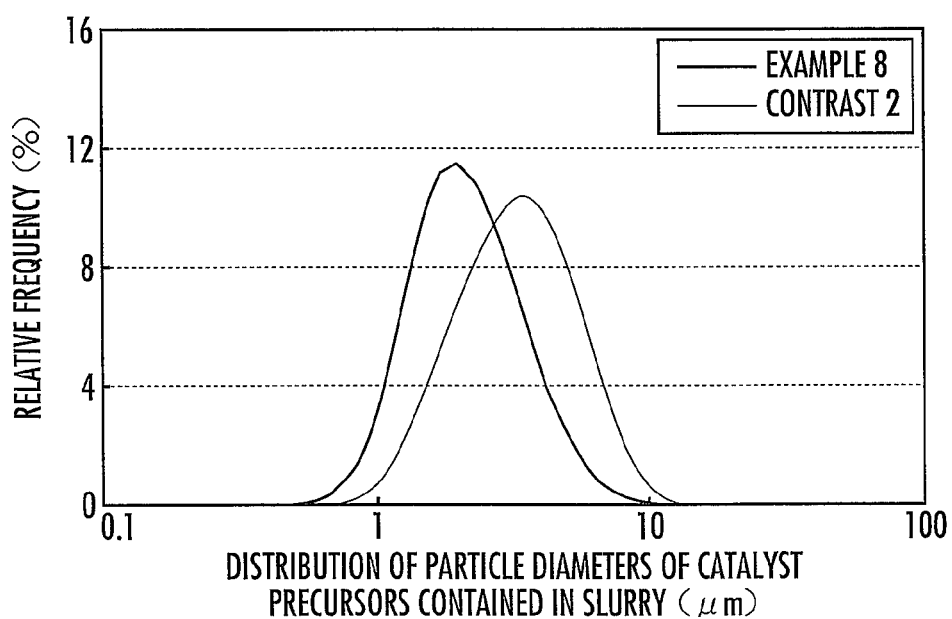
FIG. 36 is a graph illustrating diameters of the catalyst precursors contained in the slurries prepared according to the production method described in example 8 and contrast 2, respectively.

In the present example, except that the obtained catalyst precursor, water and the commercially available water-dispersion zirconia sol serving as the binder were weighted at a weight ratio of 10:50:5, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 36 and FIG. 10, respectively. As illustrated in FIG. 36, the particle diameter distribution of the catalyst precursor ranged from 0.5 to 10 µm. As illustrated in FIG. 10, the viscosity of the catalyst precursor slurry was 1.9 mPa·s.

Figure 37:
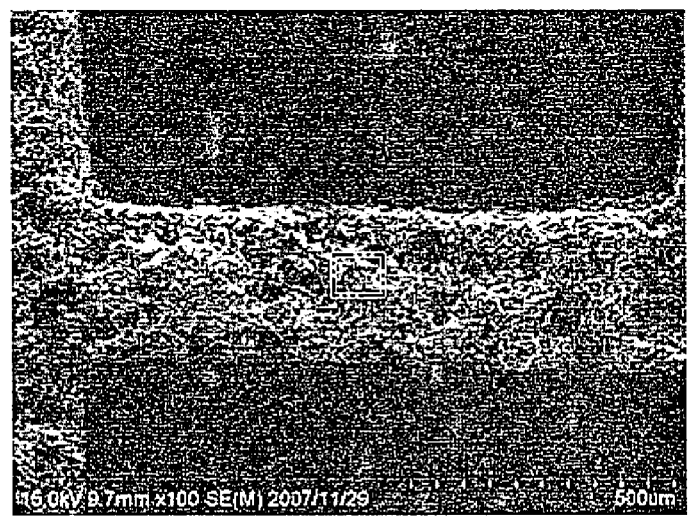
FIG. 37($a$) and FIG. 37($b$) are sectional diagrams illustrating the oxidation catalyst device for exhaust gas purification produced according to the production method described in example 8.
Figure 37:

With respect to the oxidation catalyst device for exhaust gas purification 11 prepared according to the present example, the sectional images thereof were photographed in the same manner as example 2 and shown in FIGS. 37(a) and 37(b). It is obvious from FIG. 37(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 38 and FIG. 15.

Figure 38:
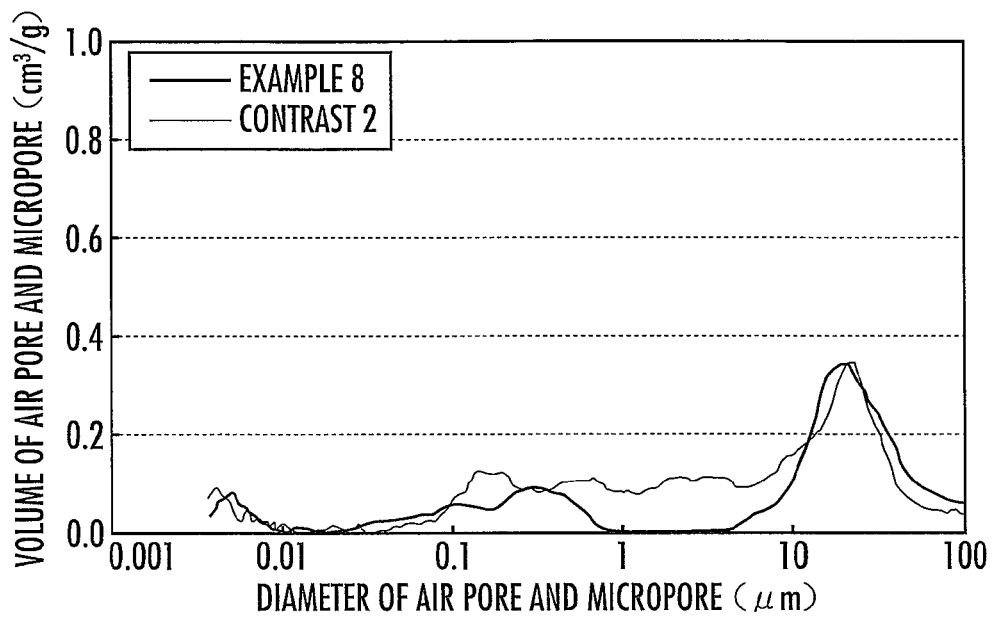
FIG. 38 is a diagram illustrating diameters of air pores distributed in the porous filter carrier and diameters of micropores distributed in the porous catalyst layer according to the oxidation catalyst device for exhaust gas purification produced according to the production method described in example 8 and contrast 2, respectively.

As illustrated in FIG. 38, the diameters of micropores in the porous catalyst layers 3a and 3b ranged from 0.02 to 1.0 µm. As illustrated in FIG. 15, the total porosity of the porous filter carrier 2 and the porous catalyst layers 3a and 3b was 48.0 V %.

Example 9

Figure 39:
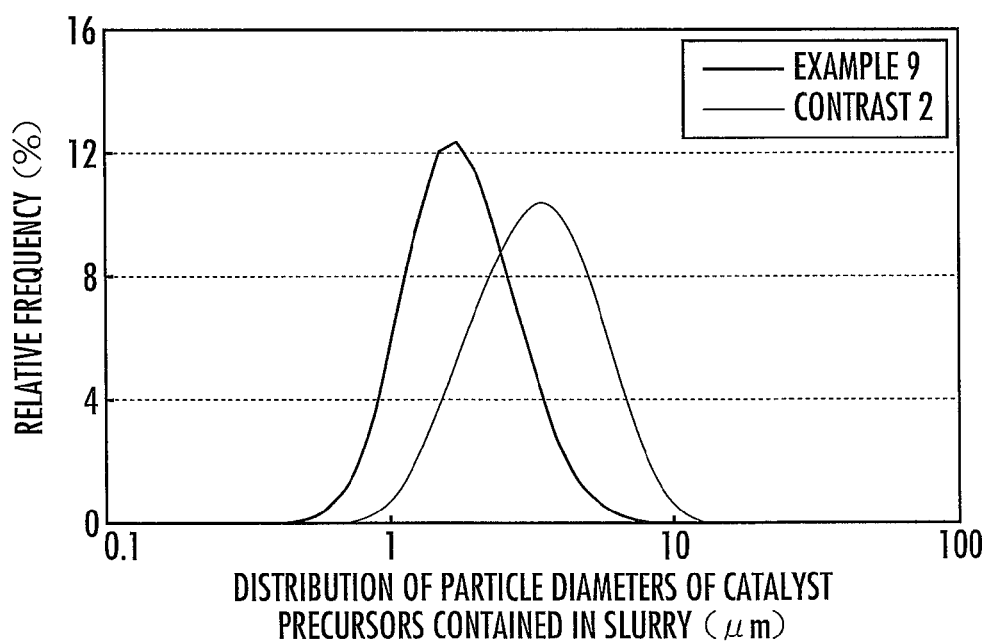
FIG. 39 is a graph illustrating diameters of the catalyst precursors contained in the slurries prepared according to the production method described in example 9 and contrast 2, respectively.

In the present example, except that the obtained catalyst precursor, water and the commercially available water-dispersion zirconia sol serving as the binder were weighted at a weight ratio of 10:60:5, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 39 and FIG. 10, respectively. As illustrated in FIG. 39, the particle diameter distribution of the catalyst precursor ranged from 0.5 to 10 µm. As illustrated in FIG. 10, the viscosity of the catalyst precursor slurry was 1.9 mPa·s.

Figure 40:
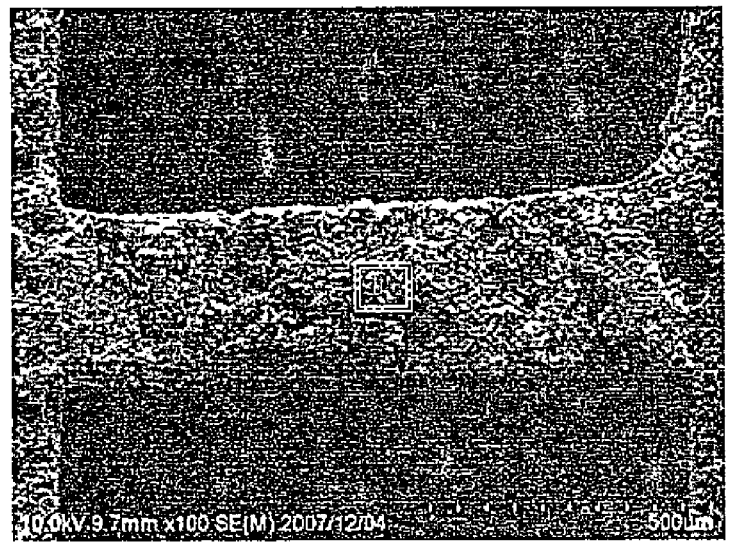
FIG. 40($a$) and FIG. 40($b$) are sectional diagrams illustrating the oxidation catalyst device for exhaust gas purification produced according to the production method described in example 9.
Figure 40:

With respect to the oxidation catalyst device for exhaust gas purification 11 prepared according to the present example, the sectional images thereof were photographed in the same manner as example 2 and shown in FIGS. 40(a) and 40(b). It is obvious from FIG. 40(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 41 and FIG. 15.

Figure 41:
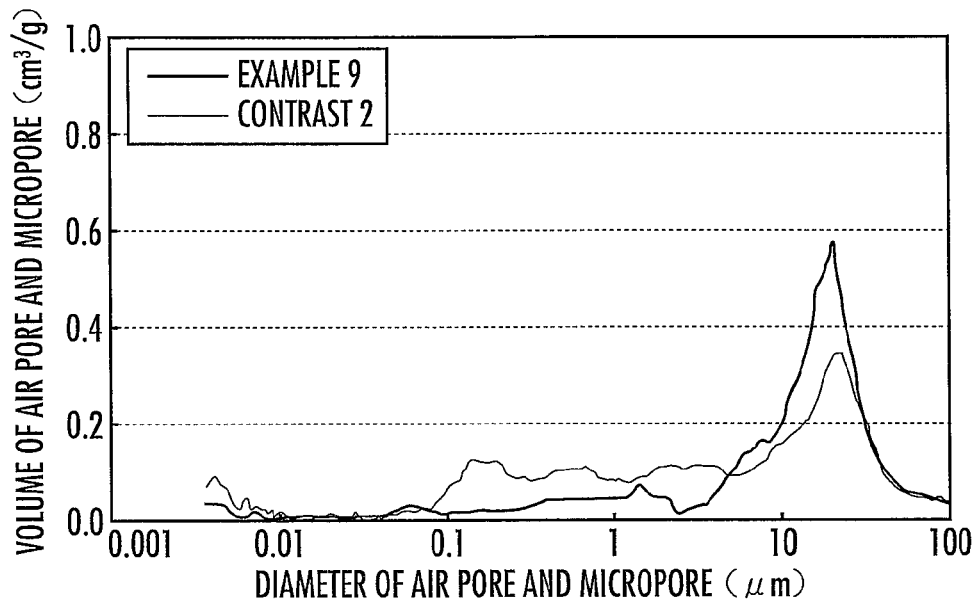
FIG. 41 is a diagram illustrating diameters of air pores distributed in the porous filter carrier and diameters of micropores distributed in the porous catalyst layer according to the oxidation catalyst device for exhaust gas purification produced according to the production method described in example 9 and contrast 2, respectively.

As illustrated in FIG. 41, the diameters of micropores in the porous catalyst layers 3a and 3b ranged from 0.05 to 2.5 µm. As illustrated in FIG. 15, the total porosity of the porous filter carrier 2 and the porous catalyst layers 3a and 3b was 47.8 V %.

Example 10

Figure 42:
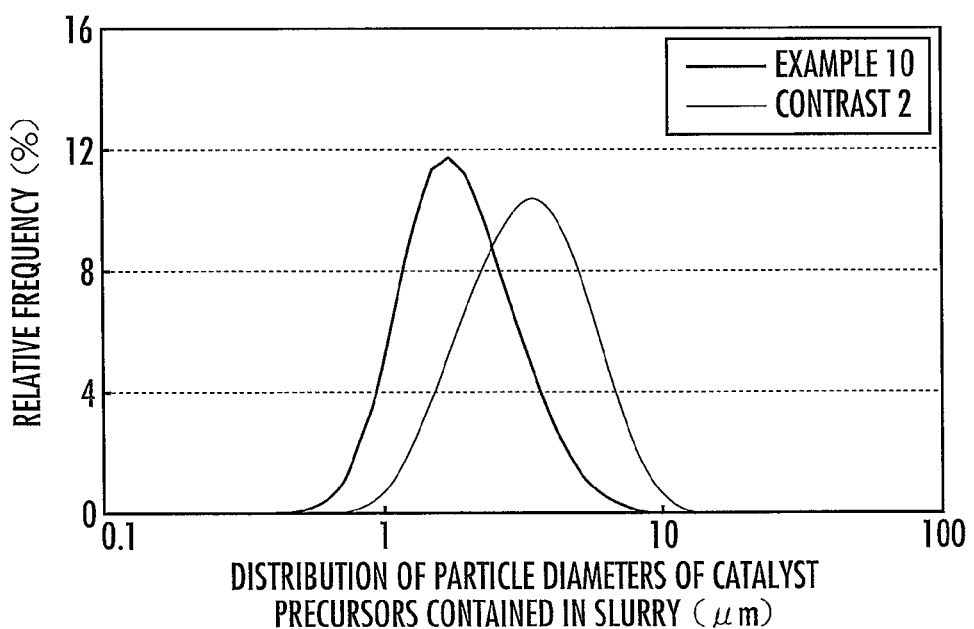
FIG. 42 is a graph illustrating diameters of the catalyst precursors contained in the slurries prepared according to the production method described in example 10 and contrast 2, respectively.

In the present example, except that the obtained catalyst precursor, water and the commercially available water-dispersion zirconia sol serving as the binder were weighted at a weight ratio of 10:70:5, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 42 and FIG. 10, respectively. As illustrated in FIG. 42, the particle diameter distribution of the catalyst precursor ranged from 0.5 to 10 µm. As illustrated in FIG. 10, the viscosity of the catalyst precursor slurry was 1.5 mPa·s.

Figure 43:
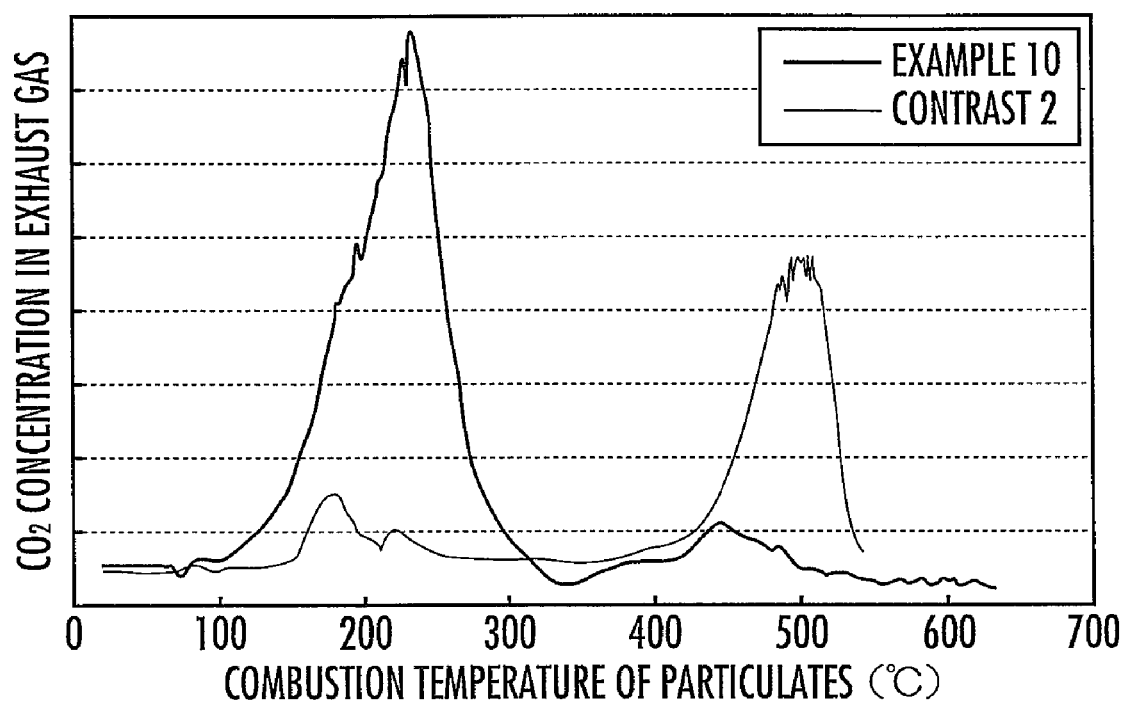
FIG. 43 is a diagram illustrating a combustion performance of particulates of the oxidation catalyst device for exhaust gas purification produced according to the production method described in example 10 and contrast 2, respectively.

An evaluation test of catalyst performance was performed on the oxidation catalyst device for exhaust gas purification 11 prepared according to the present example in the same manner as example 2 to determine the $CO_2$ concentration in the exhaust gas. The result thereof is shown in FIG. 43. Thereafter, the amount of particulates combusted by the oxidation catalyst device for exhaust gas purification 11 at a temperature below 300° C. was calculated according to FIG. 43. The result thereof is shown in FIG. 12. As illustrated in FIG. 12, the combustion performance in 3 grams of particulates captured by 1 L of approximate volume of the oxidation catalyst device for exhaust gas purification 11 was 1.52 grams.

Figure 44:
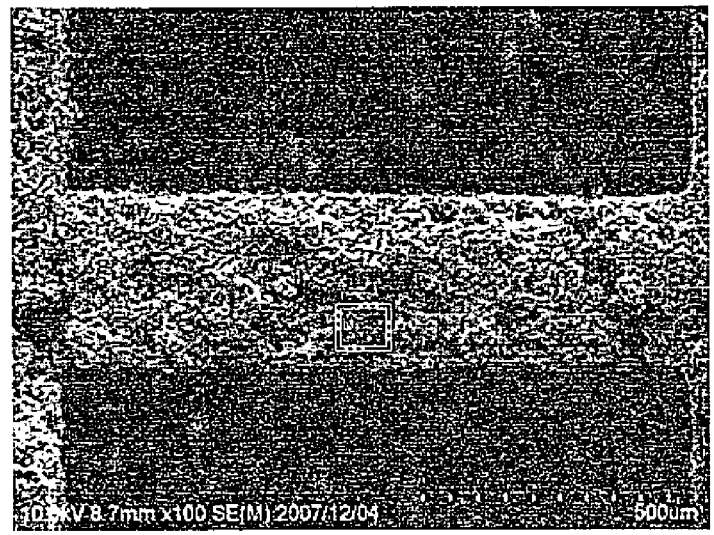
FIG. 44(a) and FIG. 44(b) are sectional diagrams illustrating the oxidation catalyst device for exhaust gas purification produced according to the production method described in example 10.
Figure 44:
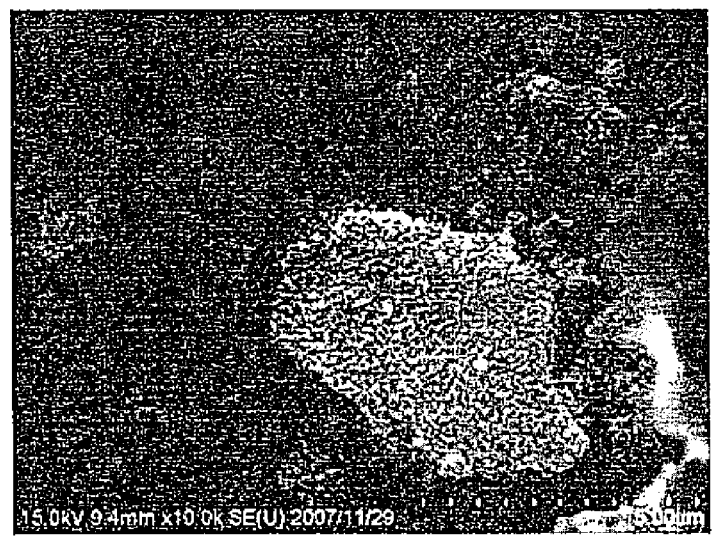

With respect to the oxidation catalyst device for exhaust gas purification 11 prepared according to the present example, the sectional images thereof were photographed in the same manner as example 2 and shown in FIGS. 44(a) and 44(b). It is obvious from FIG. 44(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 45 and FIG. 15.

Figure 45:
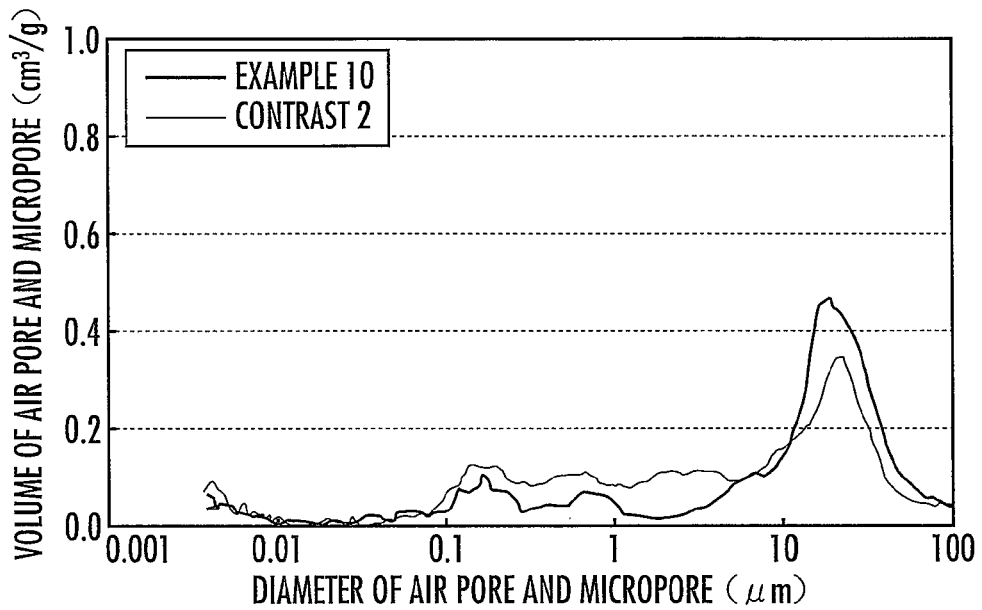
FIG. 45 is a diagram illustrating diameters of air pores distributed in the porous filter carrier and diameters of micropores distributed in the porous catalyst layer according to the oxidation catalyst device for exhaust gas purification produced according to the production method described in example 10 and contrast 2, respectively.

As illustrated in FIG. 45, the diameters of micropores in the porous catalyst layers 3a and 3b ranged from 0.05 to 2.0 μm. As illustrated in FIG. 15, the total porosity of the porous filter carrier 2 and the porous catalyst layers 3a and 3b was 49.3 V %.

Example 11

Figure 46:
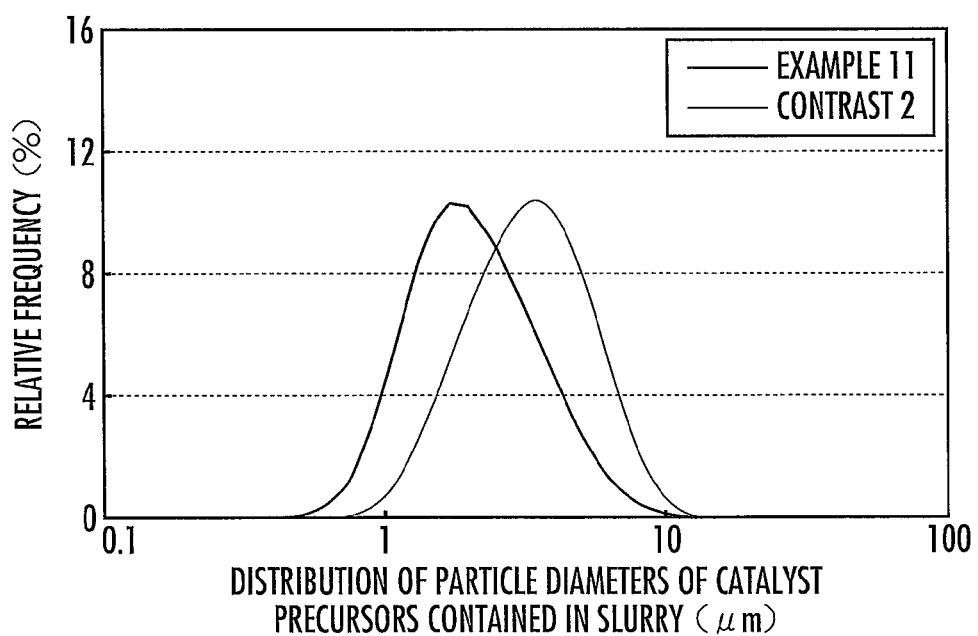
FIG. 46 is a graph illustrating diameters of the catalyst precursors contained in the slurries prepared according to the production method described in example 11 and contrast 2, respectively.

In the present example, except that the obtained catalyst precursor, water and the commercially available water-dispersion zirconia sol serving as the binder were weighted at a weight ratio of 10:150:5, the oxidation catalyst device for exhaust gas purification 11 was produced in the same manner as example 2. The particle diameter distribution of the catalyst precursor contained in the catalyst precursor slurry and the viscosity of the catalyst precursor slurry were determined during production in the same manner as example 2. The results thereof are shown in FIG. 46 and FIG. 10, respectively. As illustrated in FIG. 46, the particle diameter distribution of the catalyst precursor ranged from 0.5 to 10 μm. As illustrated in FIG. 10, the viscosity of the catalyst precursor slurry was 1.2 mPa·s.

Figure 47:
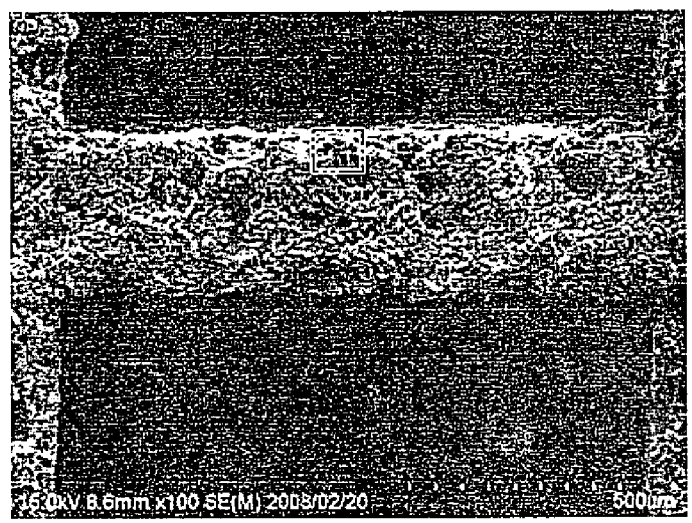
FIG. 47(a) and FIG. 47(b) are sectional diagrams illustrating the oxidation catalyst device for exhaust gas purification produced according to the production method described in example 11.
Figure 47:

With respect to the oxidation catalyst device for exhaust gas purification 11 prepared according to the present example, the sectional images thereof were photographed in the same manner as example 2 and shown in FIGS. 47(a) and 47(b). It is obvious from FIG. 47(b) that the second porous catalyst layer 3b is formed on the wall surfaces of the air pores 7 in the cell division 6.

Subsequently, with respect to the oxidation catalyst device for exhaust gas purification 11 prepared according to the present example, the diameters of air pores in the porous filter carrier 2, the diameters of micropores in the porous catalyst layers 3a and 3b, and the total porosity of the porous filter carrier 2 and the porous catalyst layers 3a and 3b were determined in the same manner as example 2. The results thereof are shown in FIG. 48 and FIG. 15.

Figure 48:
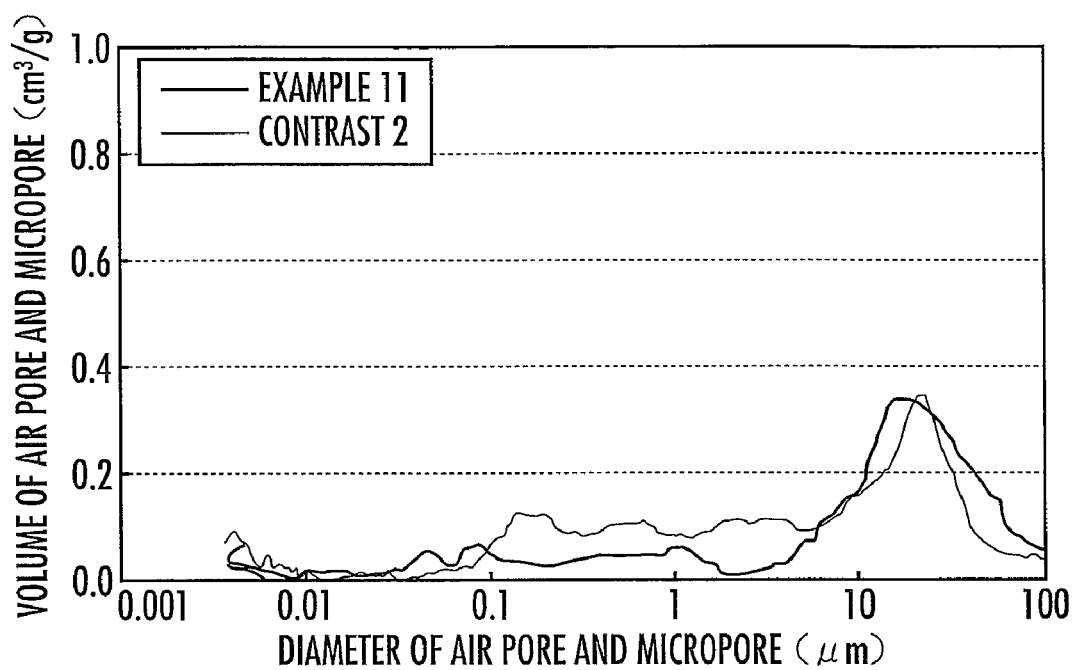
FIG. 48 is a diagram illustrating diameters of air pores distributed in the porous filter carrier and diameters of micropores distributed in the porous catalyst layer according to the oxidation catalyst device for exhaust gas purification produced according to the production method described in example 11 and contrast 2, respectively.

As illustrated in FIG. 48, the diameters of micropores in the porous catalyst layers 3a and 3b ranged from 0.05 to 1.5 μm. As illustrated in FIG. 15, the total porosity of the porous filter carrier 2 and the porous catalyst layers 3a and 3b was 49.9 V %.

[Contrast 2]

In the present contrast, first, yttrium nitrate, silver nitrate, manganese nitrate, ruthenium nitrate, malic acid and water were mixed at a molar ratio of 0.95:0.05:0.95:0.05:6:40 in a mortar for 15 minutes at 25° C. The mixture was subjected to a first calcination at 350° C. for 1 hour to yield the catalyst precursor. Subsequently, the obtained catalyst precursor, water, and a commercially available water-dispersion zirconia sol serving as the binder were weighted at a weight ratio of 10:100:10, mixed and ground in a rotation ball mill at 100 rpm for 5 hours to prepare the catalyst precursor slurry.

Thereafter, the particle diameter distribution of the catalyst precursor contained in the catalyst precursor slurry was determined in the same manner as the example 2. The result thereof is shown in FIG. 9. As illustrated in FIG. 9, the particle diameter distribution of the catalyst precursor ranged from 0.7 to 11 μm.

Next, the viscosity of the catalyst precursor slurry was determined in the same manner as example 2. The result thereof is shown in FIG. 10. As illustrated in FIG. 10, the viscosity of the catalyst precursor slurry was 2.1 mPa·s.

Thereafter, except that the catalyst precursor slurry which contains the catalyst precursor prepared from the mixture containing malic acid and has a viscosity of 2.1 mPa·s was used, the slurry was flown into the plurality of perforated galleries from the side of the porous filter carrier 2 whose the end portion is not blocked, and subsequently, the excess slurry was removed from the porous filter carrier in the same manner as example 2.

The porous filter carrier was subjected to a second calcination at 800° C. for 1 hour to form on the surface of the cell division close to the inflow cell the first porous catalyst layer composed of the composite metal oxide $Y_{0.95}Ag_{0.05}Mn_{0.95}Ru_{0.05}O_3$ to have a supported capacity of approximate 100 g/L on the surfaces of the perforated galleries whose end portions are open. However, the second porous catalyst layer was not formed on the wall surfaces of air pores in the cell division.

Thereafter, by blocking the exhaust gas outflow portions of the cells (i.e., cells that form the inflow cells) other than the outflow cells with a ceramic adhesive having silica as its main component, the inflow cells were formed. Thus, the oxidation catalyst device for exhaust gas purification 11 was obtained in the same manner as example 2.

An evaluation test of catalyst performance was performed on the oxidation catalyst device for exhaust gas purification prepared according to the present contrast in the same manner as example 2 to determine the $CO_2$ concentration in the exhaust gas. The result thereof is shown in FIG. 11. Thereafter, the amount of particulates combusted by the oxidation catalyst device for exhaust gas purification of the present contrast at a temperature below 300° C. was calculated according to FIG. 11. The result thereof is shown in FIG. 12. As illustrated in FIG. 12, the combustion performance in 3 grams of particulates captured by 1 L of approximate volume of the oxidation catalyst device for exhaust gas purification of the present contrast was 0.4 grams.

Figure 49:
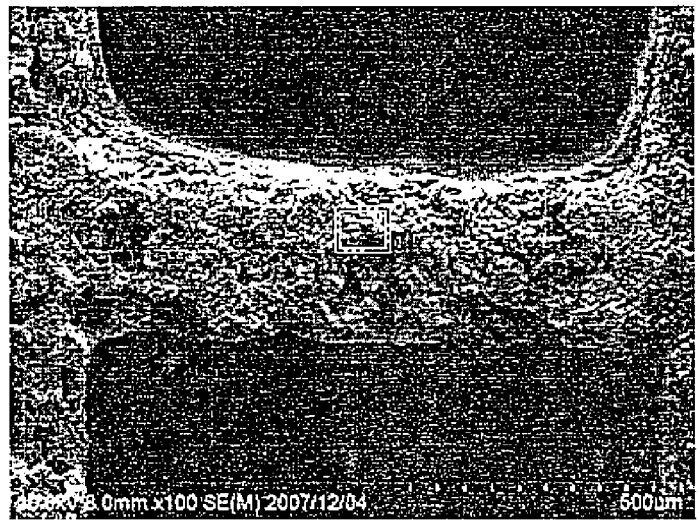
FIG. 49(a) and FIG. 49(b) are sectional diagrams illustrating the oxidation catalyst device for exhaust gas purification produced according to the production method described in contrast 2.
Figure 49:

With respect to the oxidation catalyst device for exhaust gas purification prepared according to the present contrast, the sectional images thereof were photographed in the same manner as example 2 and shown in FIGS. 49(a) and 49(b). It is obvious from FIG. 49(b) that the second porous catalyst layer is not formed on the wall surfaces of the air pores in the cell division.

Subsequently, with respect to the oxidation catalyst device for exhaust gas purification prepared according to the present contrast, the diameters of air pores in the porous filter carrier, the diameters of micropores in the first porous catalyst layer, and the total porosity of the porous filter carrier and the first porous catalyst layer were determined in the same manner as example 2. The results thereof are shown in FIG. 14 and FIG. 15.

As illustrated in FIG. 14, the diameters of micropores in the first porous catalyst layer ranged from 0.02 to 10 μm. As illustrated in FIG. 15, the total porosity of the porous filter carrier and the first porous catalyst layer was 52.5 V %.

The oxidation catalyst device for exhaust gas purification 11 according to the production method in examples 2 to 7 and 10, respectively, was produced by using the catalyst precursor slurry containing the catalyst precursor with the particle diameter distribution ranging from 0.5 to 10 μm and having the viscosity of 1.3 mPa·s. While the oxidation catalyst device for exhaust gas purification according to the production method in contrast 2 was produced by using the catalyst precursor slurry containing the catalyst precursor with the particle diameter distribution ranging from 0.7 to 11 μm and having the viscosity of 2.1 mPa·s.

It is obvious from FIGS. 11, 17, 21, 25, 29, 33 and 43 that the oxidation catalyst device for exhaust gas purification 11 produced according to the production method of examples 2 to 7 and 10, respectively, can oxidize (combust) the particulates at a lower temperature than the oxidation catalyst device for exhaust gas purification produced according to the production method of the contrast.

By viewing FIGS. 13, 18, 22, 26, 30, 34, 37, 40, 44 and 47, it is obvious that the oxidation catalyst device for exhaust gas purification 11 produced respectively according to the production method of examples 2 to 11 is formed with the second porous catalyst layer 3b on the wall surfaces of the air pores 7 in the cell division 6 in addition to the first porous catalyst layer 3a. However, as it is clearly illustrated in FIG. 49, the oxidation catalyst device for exhaust gas purification obtained from the production method of contrast 2 is formed with the first porous catalyst layer only on the surfaces of the cell division.

Therefore, it is conceivable that, in the oxidation catalyst device for exhaust gas purification 11 produced respectively according to the production method of examples 2 to 11, the probability for the porous catalyst layers 3a and 3b to contact the particulates contained in the exhaust gas has been raised.

What is claimed is:

1. A production method of an oxidation catalyst device for exhaust gas purification which purifies an exhaust gas from an internal combustion engine by oxidizing particulates contained therein with a catalyst composed of a composite metal oxide, comprising steps of:
    calcining a mixture of a plurality of metal compounds served as components of the composite metal oxide, an organic acid and water to prepare a catalyst precursor;
    grinding a mixture of the prepared catalyst precursor, water and a binder to prepare a slurry;
    coating the slurry to a porous filter carrier; and
    calcining the porous filter carrier coated with the slurry to convert the catalyst precursor into the composite metal oxide to form a porous catalyst layer supported on the porous filter carrier;
    wherein the slurry includes plural kinds of slurries which contain the catalyst precursors prepared from mutually different organic acids, respectively,
    wherein the porous catalyst layer is formed by repeating for each kind of slurry selected from the plural kinds of slurries an operation which includes coating the selected kind of slurry on the porous filter carrier and calcining the porous filter carrier coated with the selected kind of slurry;
    wherein
    the plural kinds of slurries contain the catalyst precursors prepared from citric acid, malic acid and glutamic acid, respectively;
    a first slurry containing a first catalyst precursor prepared from citric acid is coated on the porous filter carrier and a first porous catalyst layer is formed by calcining the porous filter carrier coated with the first slurry;
    a second slurry containing a second catalyst precursor prepared from malic acid is coated on the first porous catalyst layer and a second porous catalyst layer is formed by calcining the porous filter carrier coated with the second slurry; and
    a third slurry containing a third catalyst precursor prepared from glutamic acid is coated on the second porous catalyst layer and a third porous catalyst layer is formed by calcining the porous filter carrier coated with the third slurry.

2. The production method of the oxidation catalyst device for exhaust gas purification according to claim 1, wherein a pore volume percentage of the porous catalyst layer increases along a thickness direction from a surface of the porous catalyst layer which is close to the porous filter carrier toward the other surface thereof.

3. The production method of the oxidation catalyst device for exhaust gas purification according to claim 1, wherein the plurality of metal compounds is composed of an yttrium compound, a manganese compound, a silver compound and a ruthenium compound.

4. The production method of the oxidation catalyst device for exhaust gas purification according to claim 1, wherein the binder is composed of a zirconia sol.

5. The production method of the oxidation catalyst device for exhaust gas purification according to claim 1, wherein the porous catalyst layer is composed of the composite metal oxide having a general formula of $Y_{1-x}Ag_xMn_{1-y}Ru_yO_3$, wherein $0.01 \leq x \leq 0.15$ and $0.005 \leq y \leq 0.2$.

6. The production method of the oxidation catalyst device for exhaust gas purification according to claim 1, wherein the slurry contains the catalyst precursor having a particle diameter distribution ranging from 0.5 to 10 μm, and the slurry has a viscosity equal to or below 2.0 mPa·s.

7. The production method of the oxidation catalyst device for exhaust gas purification according to claim 6, wherein the viscosity of the slurry ranges from 1.3 to 2.0 mPa·s.

8. The production method of the oxidation catalyst device for exhaust gas purification according to claim 6, wherein the porous catalyst layer has a micropore with a diameter ranging from 0.01 to 3.5 μm, and a total porosity of the porous filter carrier and the porous catalyst layer ranges from 45 to 50 volume %.

9. The production method of the oxidation catalyst device for exhaust gas purification according to claim 6, wherein the porous catalyst layer is composed of the composite metal oxide having a general formula of $Y_{1-x}Ag_xMn_{1-y}Ru_yO_3$, wherein $0.01 \leq x \leq 0.15$ and $0.005 \leq y \leq 0.2$.

* * * * *